United States Patent
Labyre

(10) Patent No.: US 12,166,540 B2
(45) Date of Patent: Dec. 10, 2024

(54) EXCHANGE OF DATA BETWEEN A NFC READER AND A DUAL NFC INTERFACE TRANSPONDER

(71) Applicant: STMicroelectronics (Grenoble 2) SAS, Grenoble (FR)

(72) Inventor: Jean-Louis Labyre, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 342 days.

(21) Appl. No.: 17/608,666

(22) PCT Filed: May 14, 2020

(86) PCT No.: PCT/EP2020/063427
§ 371 (c)(1),
(2) Date: Nov. 3, 2021

(87) PCT Pub. No.: WO2020/234099
PCT Pub. Date: Nov. 26, 2020

(65) Prior Publication Data
US 2022/0173772 A1 Jun. 2, 2022

(30) Foreign Application Priority Data
May 20, 2019 (FR) ...................... 1905249

(51) Int. Cl.
*H04B 5/77* (2024.01)
*G06F 13/42* (2006.01)
(Continued)

(52) U.S. Cl.
CPC ........... *H04B 5/77* (2024.01); *G06F 13/4282* (2013.01); *G06K 7/10297* (2013.01);
(Continued)

(58) Field of Classification Search
CPC ............. G06F 13/4282; G06F 13/4291; G06F 2213/0016; G06F 13/364; G06F 13/4068;
(Continued)

(56) References Cited

U.S. PATENT DOCUMENTS

2006/0224647 A1* 10/2006 Gutnik ................... G06F 7/582
708/250
2008/0279287 A1* 11/2008 Asahina ................... H04B 1/69
375/242
(Continued)

FOREIGN PATENT DOCUMENTS

| CN | 103678189 A | 3/2014 |
| CN | 104517146 A | 4/2015 |

(Continued)

OTHER PUBLICATIONS

Tan Jun et al: "An RFID to I2C Bridge IC with Supply Interference Reduction for Flexible RFID Sensor Applications", 2019 IEEE International Conference on RFID (RFID), IEEE, Apr. 2, 2019 (Apr. 2, 2019), pp. 1-6, XP033554271, DOI: 10.1109/RFID.2019.8719257.*

(Continued)

*Primary Examiner* — Golam Sorowar
(74) *Attorney, Agent, or Firm* — Slater Matsil, LLP

(57) ABSTRACT

In an embodiment an apparatus includes a contactless transponder including a contactless interface and a wired interface, wherein the contactless transponder is configured to communicate with a contactless reader according to a contactless protocol through the contactless interface, a wired communication bus connected to the wired interface and at least one module connected to the bus, wherein the transponder is configured so that the reader is a master on the bus when the reader and the transponder communicate.

24 Claims, 39 Drawing Sheets

(51) Int. Cl.
*G06K 7/10* (2006.01)
*G06K 19/07* (2006.01)
*H04B 5/72* (2024.01)

(52) U.S. Cl.
CPC ..... *G06K 7/10336* (2013.01); *G06K 19/0723* (2013.01); *H04B 5/72* (2024.01)

(58) Field of Classification Search
CPC .. G06F 13/404; G06F 13/4295; G06F 13/385; G06F 13/42; G06F 13/362; G06F 13/1668; G06F 13/1673; G06F 13/24; G06F 11/1004; G06F 13/00; G06F 13/4027; G06F 21/44; G06F 11/221; G06F 11/2289; G06F 11/3027; G06F 13/4221; G06F 11/0745; G06F 13/4234; G06F 1/06; G06F 1/08; G06F 1/24; G06F 11/0727; G06F 11/1072; H04W 4/80; H04W 76/14; H04W 12/08; H04W 76/10; H04W 76/28; H04W 4/70; H04W 88/06; H04W 12/50; H04W 12/68; H04W 28/18; H04W 36/00; H04W 74/06; H04W 76/25; H04W 8/22; H04W 8/24; H04W 92/18; H04W 52/0229; H04W 12/02; H04W 12/03; H04W 12/06; H04W 12/12; H04W 12/122; H04W 12/128; H04W 12/37; H04W 28/0263; H04B 5/0031; H04B 5/0056; H04B 5/0062; H04B 5/02; H04B 5/00; H04B 1/401; H04B 1/38; H04B 1/40; H04B 5/0025; H04B 5/04; H04B 5/0037; H04B 1/0003; H04B 3/00; H04B 3/02; H04B 5/0068; H04B 5/0081; H04B 7/0617; H04B 7/26; H04B 1/69

See application file for complete search history.

(56) References Cited

U.S. PATENT DOCUMENTS

| | | | | |
|---|---|---|---|---|
| 2009/0243801 A1* | 10/2009 | Strzelczyk | ............... | H04B 5/73 340/10.1 |
| 2009/0261956 A1 | 10/2009 | Ojeda et al. | | |
| 2012/0196531 A1* | 8/2012 | Posch | ............... | G06Q 20/3574 455/41.1 |
| 2014/0003166 A1* | 1/2014 | Kobata | ................. | G11C 7/00 365/189.011 |
| 2015/0235059 A1* | 8/2015 | Patange | ............... | G06F 13/405 235/492 |
| 2019/0005284 A1* | 1/2019 | Hueber | ............... | G06F 13/4027 |
| 2019/0162788 A1* | 5/2019 | Wight | ............... | G01R 31/3278 |
| 2019/0173528 A1* | 6/2019 | Keehr | ................. | H04B 1/0003 |
| 2020/0367165 A1* | 11/2020 | Fernandes | ........... | H04W 52/287 |

FOREIGN PATENT DOCUMENTS

| | | |
|---|---|---|
| CN | 105159852 A | 12/2015 |
| CN | 112416841 A | 2/2021 |

OTHER PUBLICATIONS

Leikanger, Tore, et al., "Interfacing external sensors with Android smartphones through near filed communication", IOP Publishing, Measurement Science and Technology, vol. 28, published Feb. 15, 2017, 10 pages.

Tan, Jun, et al., "An RFID to I2C Bridge IC with Supply Interference Reduction for Flexible RFID Sensor Applications", 2019 IEEE International Conference on RFID, Phoenix, AZ, Apr. 2-4, 2019, 6 pages.

NXP Semiconductors, "NT3H2111/NT3H2211, NTAG I2C plus, NFC Forum Type 2 Tag compliant IC with I2C Interface", Rev. 3.0, Product data sheet, Feb. 3, 2016, 78 pages.

Turner, Matthew, et al., "The Design of a Bi-directional, RFID-based ASIC for Interfacing with SPI Bus Peripherals", 2010 53rd IEEE International Midwest Symposium on Circuits and Systems, Seattle, WA, Aug. 1-4, 2010, 4 pages.

Manoj, Abeysing Jayawardana Yapa Devaka, "Wireless Sensor System for Infrastructure Health Monitoring", A thesis submitted for Ph.D., Western Sydney University, Jan. 2017, 271 pages.

Tan, J., et al., "An RFID to IAn RFID to I2C Bridge IC with Supply Interference Reduction for Flexible RFID Sensor Applications," 2019 IEEE International Conference on RFID (RFID), Apr. 2-4, 2019, 6 pages.

Turner, M., et al., "The design of a Bi-directional, RFID-based ASIC for Interfacing with SPI Bus Peripherals," 2010 53rd IEEE International Midwest Symposium on Circuits and Systems, Aug. 1-4, 2010, 4 pages.

* cited by examiner

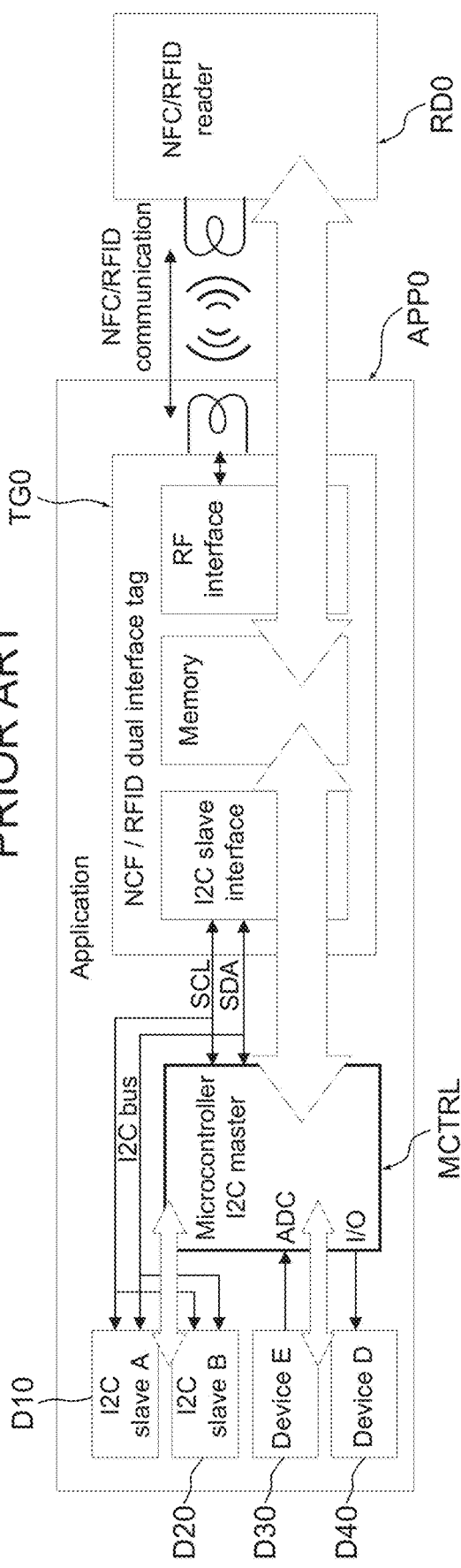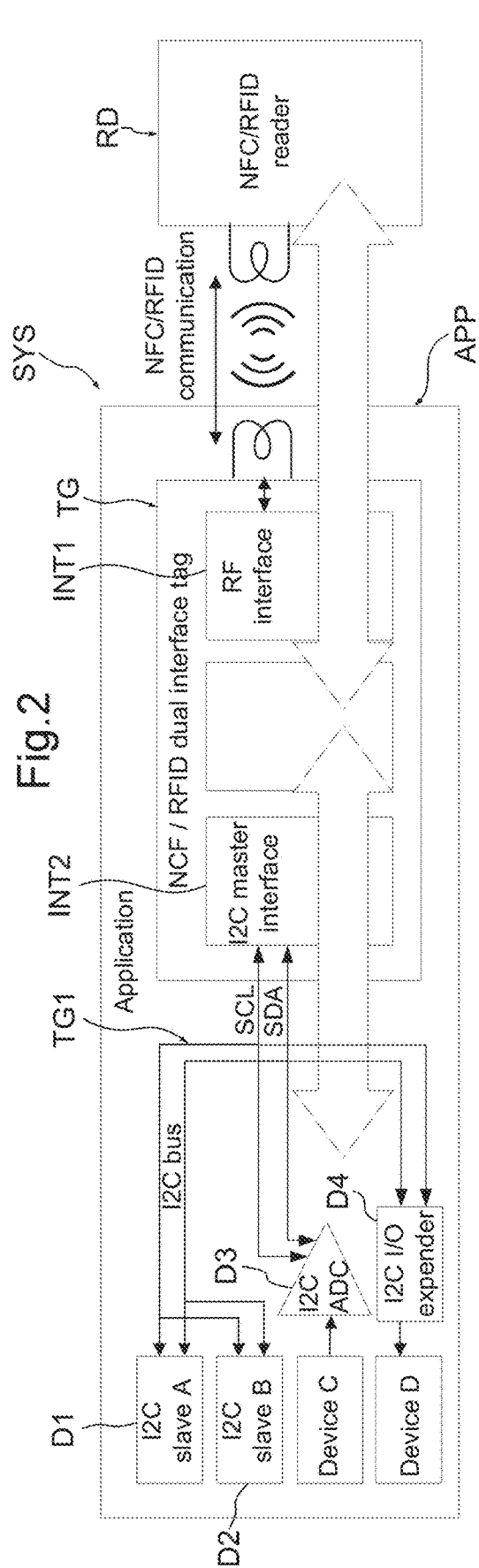

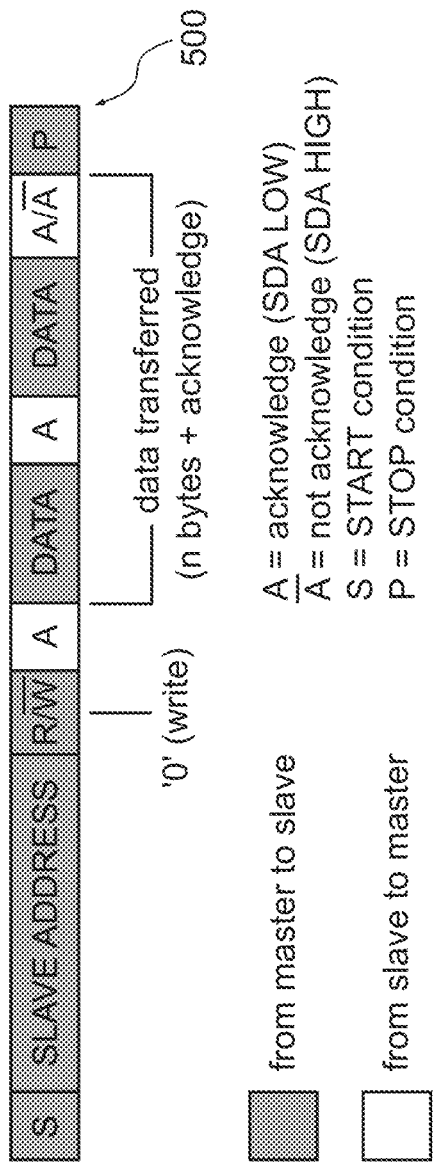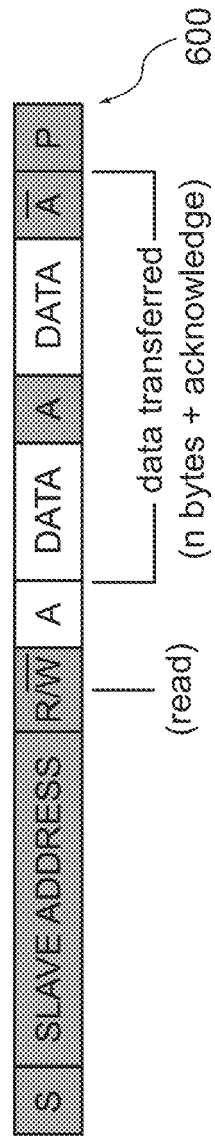

EXCHANGE OF DATA BETWEEN A NFC READER AND A DUAL NFC INTERFACE TRANSPONDER

CROSS-REFERENCE TO RELATED APPLICATIONS

This application is a national stage application of International Application No. PCT/EP2020/063427, filed May 14, 2020, which claims priority to French Patent Application No. 1905249, filed May 20, 2019, the entire contents of which are incorporated herein for all purposes by this reference.

TECHNICAL FIELD

Embodiments relate to the transfer of data between a contactless communication device, for example a contactless reader, and modules through a contactless transponder comprising a contactless an interface and a wired interface, for example an $I^2C$ or a SPI interface, connected to the modules external to the transponder.

Embodiments are particularly applicable to NFC transponders ("Near Field Communication"), for example labels (tags), intended to serve as a bridge between said external contactless communication device (reader), for example a cellular mobile phone, better known under the name of "smartphone" and said modules of an apparatus, for example a sensor without microcontroller, a control apparatus of a motor, or an e-label without microcontroller, without these examples being limiting.

Such transponders serving as a gateway may also be called "dynamic transponders" or "dynamic tags."

BACKGROUND

Near field communication, better known to those skilled in the art under the name NFC (Near Field Communication), is a wireless connectivity technology that allows communication over a short distance, for example 10 cm, between electronic devices, such as contactless smart cards or labels, and readers.

NFC technology is particularly suitable for connecting any type of user device and allows for quick and easy communications.

A contactless transponder is a transponder capable of exchanging information via an antenna with a contactless reader, according to a contactless communication protocol.

An NFC transponder, which is a contactless transponder, is a transponder compatible with NFC technology.

NFC technology is an open standard technology platform in ISO/IEC 18092 and ISO/IEC 21481 but incorporates many existing standards such as the Type A and Type B protocols defined in ISO-14443 which can be communication protocols that can be used in NFC technology.

Contactless technology can also be used in Radio Frequency IDentification (RFID) transponders compatible with ISO 15693 and ISO 18000-3.

When transmitting information between a reader and a transponder, the reader generates a magnetic field via its antenna which is generally in the standards conventionally used, a sine wave (the carrier) at 13.56 MHz.

To transmit information from the reader to the transponder, the reader uses an amplitude modulation of said carrier.

The transponder comprises processing means configured to demodulate the received carrier in order to obtain the data transmitted from the reader.

For an information transmission from the transponder to the reader, the reader generates the magnetic field (the carrier) without modulation.

The transponder antenna then modulates the field generated by the reader, according to the information to be transmitted. The frequency of this modulation corresponds to a subcarrier of said carrier. The frequency of this subcarrier depends on the communication protocol used and can be for example equal to 848 kHz.

This modulation is performed by modifying the load connected to the terminals of the transponder antenna.

Two modes of operation are then possible, a passive mode or an active mode.

In the passive mode, the transponder retro-modulates the wave coming from the reader to transmit information and does not integrate, for the transmission of information, transmission means themselves, or emitter, capable for example of generating its own magnetic field during the broadcast. Such a transponder devoid of transmitter is called passive transponder, as opposed to an active transponder which includes a transmitter.

Generally a passive transponder is devoid of power because it uses the wave from the reader to power its integrated circuit.

In some applications the passive transponder may incorporate a power supply, for example a battery.

In the active mode of operation, both the reader and the active transponder generate an electromagnetic field. Generally, this mode of operation is used when the active transponder is provided with a power source, for example a battery.

Each of the NFC devices (reader and transponder) transmits the data using a modulation scheme. Here again, the modulation results in a load modification and this is then referred to as active load modulation communication.

Compared to a passive communication mode, larger operating distances of up to 20 cm are obtained depending on the protocol used.

Moreover, the use of active load modulation makes it possible to use very small antennas.

SUMMARY

Embodiments provide passive transponders and active transponders.

During the exchange between the transponder and the contactless reader, for example, the "smartphone," the information or useful data is encapsulated in frames having a format defined according to the type of protocol used.

The transponder processing means are in particular configured to de-encapsulate the data that will be transferred to the $I^2C$ interface, and in the opposite direction encapsulate the data coming from the $I^2C$ interface, in frames that will be transmitted to the reader ("smartphone for example) by contactless communication.

In other words, at present, NFC/RFID dual interface tags are non-volatile memories with both a contactless interface and a wired interface (usually $I^2C$). The $I^2C$ interface is slave and connected to an $I^2C$ master, usually a microcontroller.

An external reader can transmit data to, and receive data from the microcontroller by communicating through the dynamic tag, then used as a buffer between wireless and wired worlds.

The microcontroller itself communicates with other devices or modules on board of the application through various interfaces (frequently serial buses like $I^2C$).

As indicated above an NFC/RFID reader, external to an application, may need to communicate with non-NFC/RFID devices, or modules, on board of an application or apparatus, for example: reading data from sensors, updating displays, storing/reading data to/from non-volatile memories, controlling other devices though I/O expenders, reading ADCs values, etc.

A conventional solution, diagrammatically illustrated in FIG. 1, is to use a NFC/RFID dual interface tag TG on board of the application or apparatus APP, connected as I²C slave to a microcontroller MCTRL:

The NFC/RFID reader RD manages the RF communication with the tag TG.

The NFC/RFID dual interface tag TG acts as a buffer between the NFC/RFID reader RD and the microcontroller MCTRL.

The microcontroller MCTRL acts as I²C master for the non-NFC/RFID devices, and controls all communications with the NFC/RFID tag TG and with non-NFC/RFID devices.

More precisely, as illustrated in the conventional example of FIG. 1, a microcontroller is driving different devices D1-D4 on board of the application APP through different channels: I²C bus, ADC, GPI/O . . . .

The NFC/RFID dual interface tag TG has two functions:

Store configuration bytes for the microcontroller and store data log for the NFC/RFID reader.

Pass-through for data exchange between NFC/RFID reader and microcontroller.

In any case, the microcontroller is the I²C master device of the application and the NFC/RFID tag acts as a slave.

NFC/RFID reader indirectly accesses application devices through the microcontroller and the NFC/RFID dual interface tag.

Although FIG. 1 illustrates an I²C bus, a similar conventional solution is to use a NFC/RFID dual interface tag on board of the application or apparatus, connected as SPI slave to a microcontroller which acts as the SPI master on the SPI bus.

However those known solutions have drawbacks:

Application BOM (Bill Of Materials) cost: the required microcontroller cost is most of the time much higher than all other components of the application (i.e. Dual interface NFC tag+temperature sensor cost much smaller than microcontroller cost)

Application development cost: FW (Firmware) must be developed for the required microcontroller.

Application power efficiency: the required microcontroller adds additional power consumption to the application.

Application bugs/Maintenance: embedded FW inside the required microcontroller can be subject to bugs and FW maintenance updates can be necessary.

Application size: the required microcontroller can add several mm² to the application size.

There is accordingly a need for improving those conventional solutions.

According to an embodiment such a new solution may lead to application (apparatus) cost reduction, application power consumption reduction, application development simplification, application maintenance reduction and simplification or application size reduction.

According to an embodiment, a system is proposed comprising a contactless reader and an apparatus, said apparatus including a contactless transponder (or tag).

Said transponder is for example a NFC/RFID dual interface transponder.

Said transponder includes a contactless interface and a wired interface and being configured to communicate with said reader according to a contactless protocol through said contactless interface, said apparatus including a wired communication bus, for example an inter-integrated circuit (I²C) bus or a SPI bus or a so called SMBus, connected to said wired interface and at least one module connected to said bus.

The reader and the transponder are configured so that the reader is the master on said bus during said communication between the reader and the transponder.

The reader is advantageously configured to directly communicate with the module(s), which are slave modules, through the NFC/RFID dual interface transponder (or tag), i.e. without passing through any microcontroller.

Said at least one module is also advantageously configured to directly communicate with the reader through said transponder, i.e. without passing through any microcontroller.

Although the reader is not directly connected to the wired communication bus, the reader can be considered to be actually the master of the application or the master on the bus, because it initiates commands within frames consistent with said contactless protocol, and those commands will be transformed into commands on the bus consistent with the protocol used on said bus.

The wired interface of the tag, which is actually connected to the bus, is a master interface.

Thus it can be also said that the reader is the master on the bus through the master wired interface.

According to another embodiment a transponder is proposed belonging to the system defined above.

More particularly a transponder is proposed including a contactless interface and a wired interface and being configured to communicate with a reader according to a contactless protocol through said contactless interface, said wired interface being configured to be connected to a wired communication bus connected to at least one module connected to said bus, the transponder being configured so that the reader is the master on said bus during said communication between the reader and the transponder.

Said transponder is advantageously a gateway during a direct communication between said reader and said at least one module through said transponder.

According to an embodiment, the transponder comprises pass-through means configured to implement a pass-through function for message exchange between the reader and said at least one module.

According to an embodiment, said pass-through means is configured to transform commands initiated by the reader within frames consistent with said contactless protocol, into commands on the bus consistent with a protocol used on said bus.

According to an embodiment, said pass-through means comprises first volatile memory means configured to buffer data payload of commands coming from the reader through the contactless interface and data payload of responses intended to be sent to the reader through said contactless interface.

According to an embodiment, said first volatile memory comprises at least one buffer.

According to an embodiment, said pass-through means further comprises second volatile memory means configured to store control data, said pass-through means being configured to implement said pass-through function for message exchange between the reader and said at least one module, on the basis of said control data.

According to an embodiment said second memory means comprises a plurality of registers.

According to an embodiment, said control data comprises first control data sent in or deduced from data payloads of some of commands initiated by the reader.

According to an embodiment, said pass-through means further comprises
- a first state machine configured to cooperate with said reader through the contactless interface and configured to write/read said first memory means and a part of said second memory means based on commands received from the reader,
- a second state machine configured to cooperate with said bus through said wired interface based on the content of a part of said second memory means and configured to write/read said first memory means and a part of said second memory means.

According to an embodiment, said second state machine is configured to read said data payload of commands from the first volatile memory means and to execute them on the bus, to manage the clock and all bus protocol signaling information.

According to an embodiment, said second state machine is configured to read the bus answers and to store them in the first volatile memory means for them to be read by the first state machine.

According to an embodiment, and whatever the kind of bus (PC or SPI for example) the transponder is configured to implement a half-duplex message exchange mechanism on the side of said contactless interface.

According to a variant, said bus maybe an PC bus.

According to embodiments compliant with this variant:
- said commands initiated by the reader comprises at least one request of a write operation into said at least one module or at least one request of a read operation into said at least one module;
- said at least one request of a write operation into said at least one module comprises the address of said at least one module and the data to be written in said at least one module, and said at least one request of a read operation into said at least one module comprises the number of bytes to read and the address of said at least one module;
- said first control data comprises data defining if a command from the reader is a write operation or a read operation in said at least one module;
- said control data comprises data chosen among
  - data defining the presence or the absence of an operation to be executed on said bus,
  - data indicating whether the execution of a read operation requested by the reader is terminated,
  - data indicating whether the result of a read operation requested by the reader is stored in the transponder,
  - data indicating whether a read or write operation requested by the reader is successful.

According to another variant, said bus is a SPI bus.

According to embodiments compliant with this another variant:
- the transponder maybe configured to implement a half-duplex or a full duplex message exchange mechanism on the side of said wired interface;
- said commands initiated by the reader comprises at least one write command or at least one request of a read command;
- said first control data comprises data defining configuration of the SPI bus;
- said control data comprises data indicating a status "ready to transmit" or the status of the operation or numbers of bytes to transmit;
- said transponder comprises a shift register connected to the bus, and in half-duplex transmission mode, the second state machine is configured to control the direction of the connection of the shift register on the bus.

According to another embodiment an apparatus is proposed including the transponder as defined and said at least one module.

According to another embodiment a method is proposed for managing data exchange between a contactless reader and an apparatus, said apparatus including a contactless transponder, said transponder including a contactless interface and a wired interface, said transponder communicating with said reader according to a contactless protocol through said contactless interface, said apparatus including a wired communication bus connected to said wired interface and at least one module connected to said bus, said method comprising having said reader act as the master on said bus during said communication between the reader and the transponder.

According to embodiments applicable with a wired interface of the I$^2$C type, the following features are proposed:

NFC/RFID reader directly communicates with I$^2$C devices on board of application or apparatus through NFC/RFID dual interface tag.

The NFC/RFID dual interface tag has two functions:

Store application configuration bits and data log

Pass-through for data exchange between NFC/RFID reader and I$^2$C devices or modules on application or apparatus.

The NFC/RFID reader is the real I$^2$C master of the whole application.

Energy harvesting can be used to power the whole application.

More particularly:

An I$^2$C pass through function is implemented in a NFC/RFID dual interface tags, based on a buffer, RF/I$^2$C state machine means and a few registers in order to remove the need of a microcontroller.

A NFC/RFID reader can act as the I$^2$C master of the application, in place of a microcontroller.

In the NFC/RFID tag, a half-duplex exchange mechanism allows exchange of messages from NFC/RFID interface and I$^2$C interface.

In the NFC/RFID tag, a volatile memory (mailbox/FIFO) buffers the I$^2$C commands from NFC/RFID interface and the I$^2$C responses to NFC/RFID interface, alternatively.

A state machine reads I$^2$C commands data from the buffer and execute them on the I$^2$C bus, managing the clock and all I$^2$C signaling.

The state machine reads I$^2$C answers and acknowledge bits on the I$^2$C bus and store them in the buffer for them to be read by the NFC/RFID interface.

In particular, usage of a half-duplex buffer, communication signalling through registers and specific state machine inside the NFC/RFID dual interface tag to allow I$^2$C command pass through from NFC/RFID reader to I$^2$C slave devices contribute to lead to:

Application (apparatus) cost reduction.

Application power consumption reduction.

Application development simplification.

Application maintenance reduction and simplification.

Application size reduction.

According to particular embodiments:

An internal buffer (volatile memory, FIFO like) is embedded in the dual interface NFC/RFID tag. The buffer is half duplex and can be accessed only by one side at a time.

An I²C/RF pass-through state machine is added in the dual interface NFC/RFID tag. The state machine controls the SCL clock and SDA data signals of the I²C bus.

Some control registers are added to handle exchange signaling between RF and I²C.

The NFC/RFID reader indicates to the NFC/RFID tag, through RF commands, the number I²C of bytes to read. The NFC/RFID tag can detect nature of I²C command (read or write) by deducting from the number of bytes to read (or reading last bit of first I²C command byte).

It is also possible to detect the nature of the I²C command (read or write) by using a specific dedicated RF command (for example a specific command for an I²C read command and another specific command for an I²C write command.

The NFC/RFID reader transmits I²C commands data bytes to the NFC/RFID tag through RF command's data payload. They are stored in the buffer. I²C signaling bits are not included.

Once I²C command data bytes are written in the buffer, the state machine sends those bytes from the buffer to the I²C bus, adding proper I²C signaling bits.

The I²C clock can be generated by an internal oscillator inside the transponder or can be derived from the RF signal, for example the 13.56 MHz signal sent by the reader.

If data bytes are to be read on the I²C bus in return (I²C read command), the state machine reads them and store them in the buffer. The state machine is managing reading/writing of I²C signaling bits.

The I²C master state machine is also constantly reading the acknowledge bits and storing the value in a volatile memory bit.

The NFC/RFID reader is polling the NFC/RFID tag to check if the I²C transaction is finished.

Once I²C transaction is finished, the NFC/RFID reader reads the acknowledge bit value and the content of the buffer if any I²C answer is expected.

According to embodiments applicable with a wired interface of the SPI type, the following features are proposed:

An SPI pass through function is implemented in a NFC/RFID dual interface tags, based on a TX and a RX buffer, a shift register, a state machine and a few registers in order to remove the need of a microcontroller.

A NFC/RFID reader can act as the SPI master of the application, in place of a microcontroller.

In the NFC/RFID tag, a half-duplex exchange mechanism allows exchange of messages from NFC/RFID interface and SPI interface.

A half-duplex or a full duplex messages exchange on the side of the wired (SPI) interface maybe implemented.

In the NFC/RFID tag, two volatile memory (SRAM) buffers the SPI Tx bytes from NFC/RFID interface and the Rx bytes to NFC/RFID interface.

A state machine reads SPI Tx bytes data from the Tx buffer and send them on the SPI bus, while receiving in the same time the Rx bytes from slave, through s shift register.

The state machine manages the clock and the slave selection signals.

In particular, usage of a full duplex buffer or usage of a half-duplex SPI mode, communication signalling through registers and specific state machine inside the NFC/RFID dual interface tag to allow SPI command pass through from NFC/RFID reader to SPI slave devices contribute to lead to Application (apparatus) cost reduction.

Application power consumption reduction.

Application development simplification.

Application maintenance reduction and simplification.

Application size reduction.

According to particular embodiments:

An internal transmission (Tx) buffer (volatile memory, FIFO like) is embedded in the dual interface NFC/RFID tag. The buffer is half duplex and can be accessed only by one side at a time;

An internal receiving (Rx) buffer (volatile memory, FIFO like) is embedded in the dual interface NFC/RFID tag. The buffer is half duplex and can be accessed only by one side at a time;

A shift register of one byte is embedded in the dual interface NFC/RFID tag. This shift register is used to transmit and receive data on the SPI bus in full-duplex way;

SPI/RF pass-through state machine means is added in the dual interface NFC/RFID tag. The state machine means controls the clock, MISO and MOSI data signals of the SPI bus, as well as the transfer of data from/to the Tx and Rx buffers and the shift register;

Some control registers are added to handle exchange signaling between RF and SPI (SPI ready to transmit, SPI transmit done);

The NFC/RFID reader indicates to the NFC/RFID tag, through RF commands the number SPI bytes to exchange;

The NFC/RFID reader write SPI data bytes to be transmitted to the NFC/RFID tag through RF command's data payload, They are stored in the Tx buffer;

Once SPI data bytes are written in the Tx buffer, the state machine puts the slave select pin to low to select the SPI slave and sends those bytes from the Tx buffer to the SPI bus, through the shift register;

Simultaneously, the state machine reads data from the SPI slave in the shift register and store the read bytes in the Rx buffer;

Once all requested bytes are transmitted and received to/from the SPI bus, the state machine rise the slave select line to deselect the SPI slave.

The NFC/RFID reader is polling the NFC/RFID tag to check if the SPI transaction is finished.

Once SPI transaction is finished, the NFC/RFID reader reads Rx buffer to get SPI slave answer.

BRIEF DESCRIPTION OF THE DRAWINGS

Other advantages and features of the invention will appear in the detailed description below and in the appended drawings which are not limitative, in which:

FIG. 1, already described, illustrates the prior art;

FIGS. 2-25 illustrate embodiments using an I²C bus; and

DETAILED DESCRIPTION OF ILLUSTRATIVE EMBODIMENTS

As shown on FIG. 2, which illustrates an example of a system SYS according to embodiments, a NFC/RFID reader RD can act as the I²C master of the application or apparatus APP, in place of a microcontroller.

In other words the reader RD is configured to directly communicate with slave modules D1-D4 of the apparatus APP through a contactless interface INT1 of a NFC/RFID dual interface transponder (or tag) TG, i.e. without passing through any microcontroller.

Although the reader RD is not directly connected to the I²C bus BS, the reader RD can be considered to be actually the master of the application or the master on the I²C bus, because it initiates commands within RF frames, and those commands will be transformed into I²C commands the I²C bus consistent with the I²C protocol.

The I²C interface INT2 of the tag, which is actually connected to the I²C bus BS, is a master interface.

Thus it can be also said that the reader is the master on the bus BS through the I²C master interface INT2.

Figure 3:
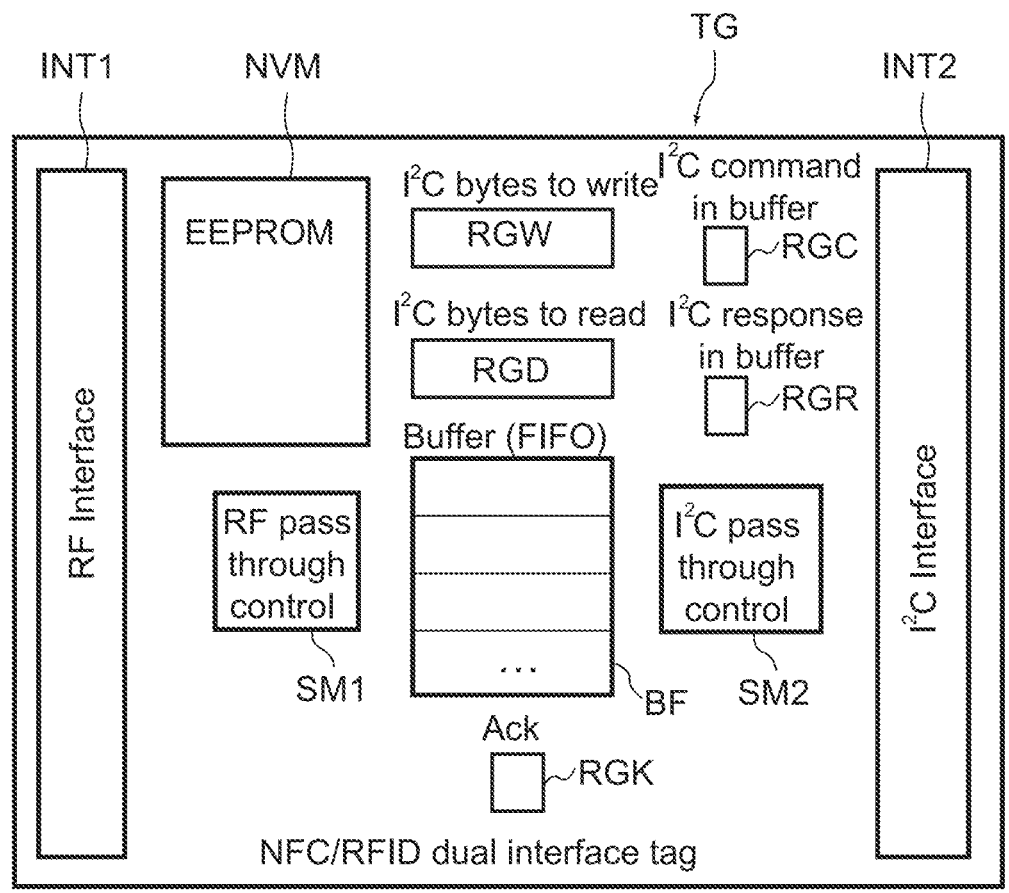

As shown on FIG. 3, an example of a NFC/RFID dual interface transponder (or tag) according to embodiments integrates:

the RF contactless interface INT1
the I²C interface INT2
A non-volatile memory NVM, for example an EEPROM,
First volatile memory means, like a buffer BF (FIFO), to store I²C bytes,
Second volatile memory means, including a plurality of registers, for example the following ones:
A register RGW to store the number of I²C bytes to write.
A register RGD to store the number of I²C bytes to read.
A register RGC (containing one bit) to signal that I²C command is present in buffer BF.
A register RGR (containing one bit) to signal that I²C response is present in buffer BF.
A register RGK (containing one bit) to record Ack bit value. This register RGK is reset on read.
A state machine SM1 for RF pass through control.
A state machine SM2 for I²C pass through control.

Such a tag TG may be realized for example by an integrated circuit or chip, for example from an integrated circuit of the integrated circuits family having the reference ST25 at STMicroelectronics.

The I²C protocol is well known by the man skilled in the art and can be found in the I²C specification. Some features of the I²C protocol are now reminded.

The I²C bus uses two wires: serial data (SDA) and serial clock (SCL).

All I²C master and slave devices are connected with only those two wires.

A device acting as a master generates bus clock and initiates communication on the bus, other devices are slaves and respond to the commands on the bus.

In order to communicate with specific device, each slave device must have an address which is unique on the bus.

I²C master device does not need an address since no other (slave) device sends commands to the master.

Both signals SCL and SDA are bidirectional.

For each clock pulse one bit of data is transferred. The SDA signal can only change when the SCL signal is low. When the clock is high, the data should be stable.

Each I²C command initiated by master device starts with a START condition and ends with a STOP condition. For both conditions SCL has to be high. A high to low transition of SDA is considered as START and a low to high transition as STOP.

After the Start condition the bus is considered as busy.

After the Start condition the master can generate a repeated Start. This is equivalent to a normal Start and is usually followed by the slave I²C address.

Figure 4:
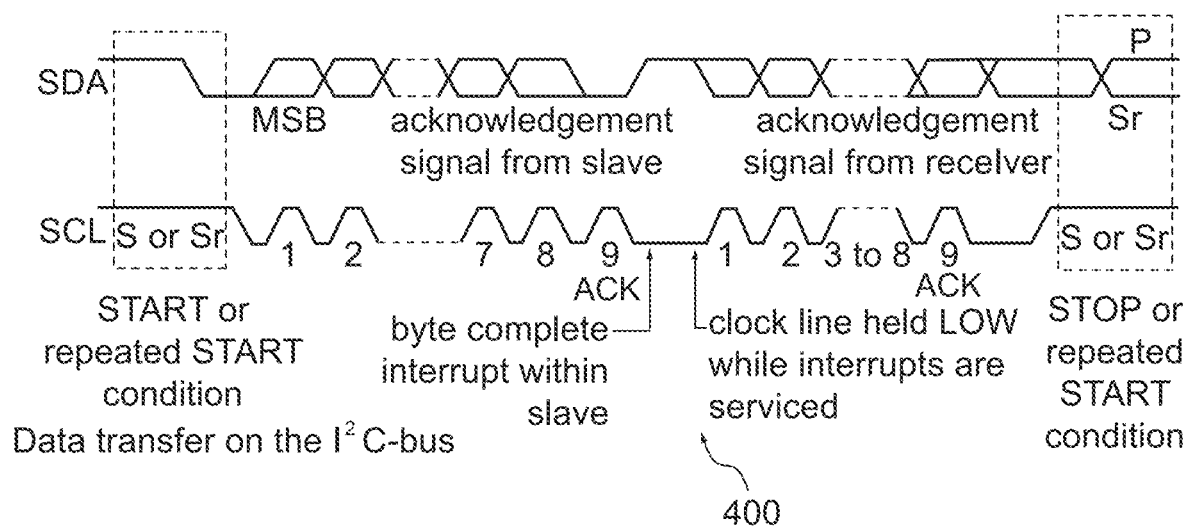

FIGS. 4, 5 and 6 (extracted from I²C specification version 6.0, Apr. 4, 2014) illustrate features of the I²C protocol.

As illustrated in FIG. 4, data on the I²C bus is transferred in 8-bit packets (bytes). There is no limitation on the number of bytes, however, each byte must be followed by an acknowledge bit ACK from a slave device. This bit ACK signals whether the slave device is ready to proceed with the next byte. For all data bits and the acknowledge bit ACK, the master must generate clock pulses. If the slave device does not acknowledge transfer, this means that there is no more data or the device is not ready for the transfer yet. The master device must either generate Stop or Repeated Start condition.

Data is transferred with the Most Significant Bit (MSB) first. If a slave cannot receive or transmit another complete byte of data until it has performed some other function, for example servicing an internal interrupt, it can hold the clock line SCL LOW to force the master into a wait state. Data transfer then continues when the slave is ready for another byte of data and releases clock line SCL.

As illustrated in FIGS. 5 and 6, each slave device on the bus should have a unique 7-bit address.

The communication starts with the Start condition, followed by the 7-bit slave address and the data direction bit R/W.

If this bit R/W is 0 (FIG. 5) then the master will write to the slave device. Otherwise, if the data direction bit R/W is 1, the master will read from slave device (FIG. 6).

After the slave address and the data direction bit R/W are sent, the master can continue with reading or writing.

The communication is ended with the Stop condition which also signals that the I²C bus is free.

If the master needs to communicate with other slaves it can generate a repeated start with another slave address without generation Stop condition.

If the master only writes to the slave device. Then the data transfer direction is not changed (FIG. 5) The slave receiver acknowledges each byte.

If the master only needs to read from the slave device then it simply sends the I²C address with the R/W bit set to read. After this the master device starts reading the data. (FIG. 6).

At the moment of the first acknowledge, the master-transmitter becomes a master-receiver and the slave-receiver becomes a slave-transmitter. This first acknowledge A is still generated by the slave. The master generates subsequent acknowledges. The STOP condition is generated by the master, which sends a not-acknowledge just before the STOP condition.

FIGS. 7-11 explain an example of successive steps of the process of writing bytes into a slave module, those bytes being sent by the reader RD in order to be transmitted to a slave module of the apparatus APP.

Figure 7:
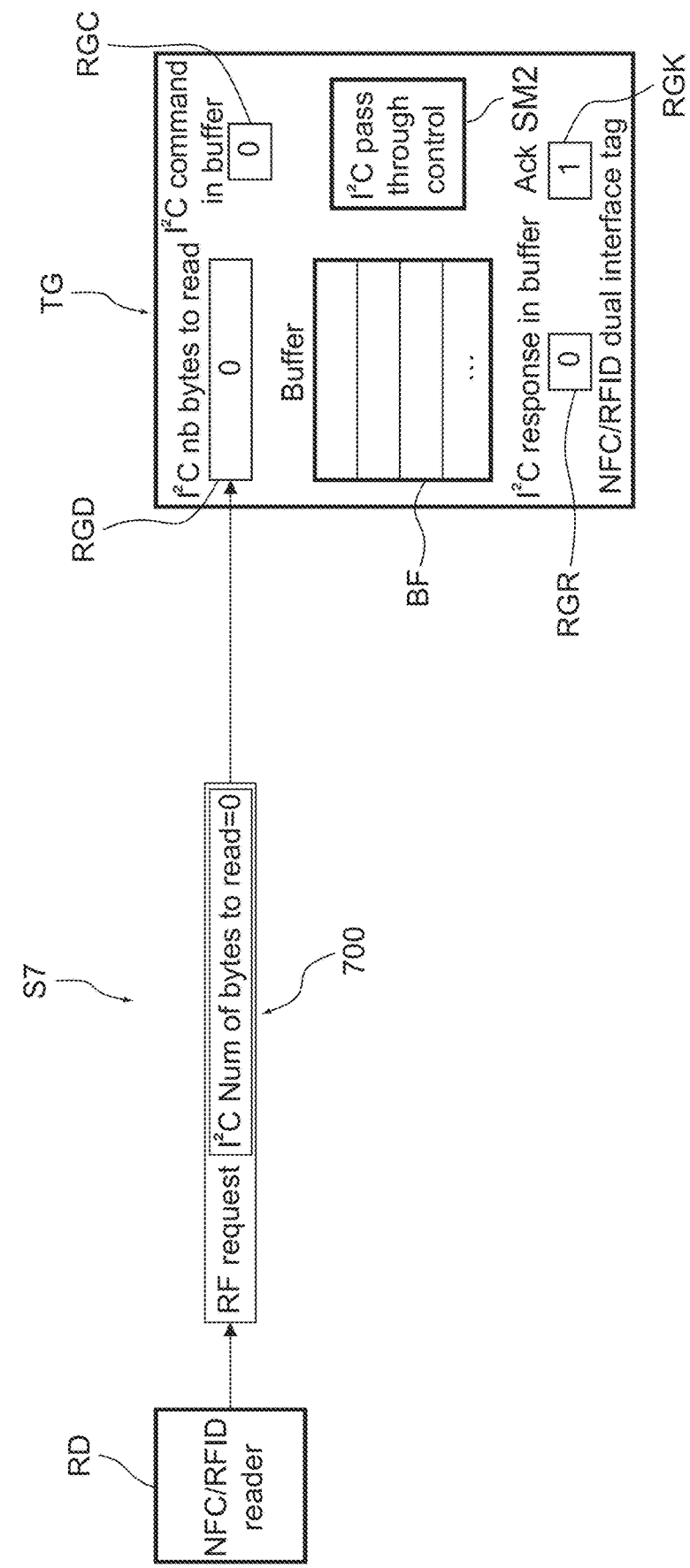

As illustrated in FIG. 7, the NFC/RFID reader RD sends (step S7) a RF command 700 to the NFC/RFID tag to program the number of I²C bytes to be read.

The RF command 700 has a conventional structure compliant with the used RF protocol, and the number of I²C bytes to be read is included in the data payload of the RF command 700.

Here the value of the number of I²C bytes to be read is equal to 0 as there is no byte to be read on I²C bus.

This number of I²C bytes to be read is extracted from the RF command by the state machine SM1 (RF pass through control) and written in the register RGD by the state machine SM1 also (RF pass through control).

The register RGC and the register RGR contain a 0 value while the register RGK contains a 1 value.

Figure 8:
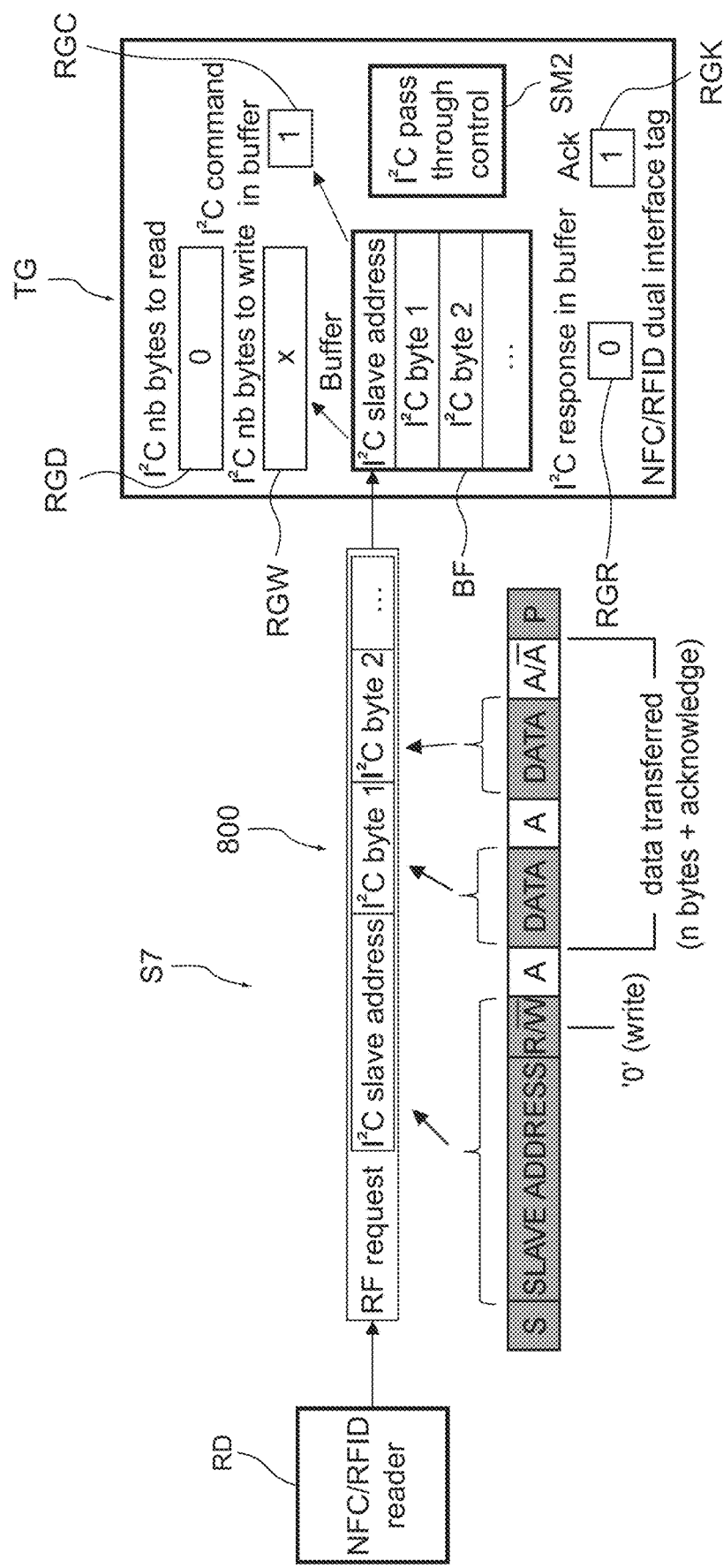

As illustrated in FIG. 8, the NFC/RFID reader RD sends (step S8) a RF write command 800 to the NFC/RFID tag.

This RF command 800 contains I²C bytes to be written on I²C bus as well as the I²C slave address of the slave module intended for receiving those I²C bytes.

The I²C slave address and the I²C bytes form a complete I²C message intended for being delivering to the I²C bus but without I²C signaling information, i.e. without here the start and stop conditions.

The I²C slave address, which is the first byte, includes the R/W bit which is set to "write".

This toggles the "I²C command in buffer" bit of the register RGC

In other words the register RGC is set to 1 by the state machine SM1 (RF pass through control).

The state machine SM1 (RF pass through control) stores the x I²C bytes into the buffer BF and updates the register RGW with this I²C number x of bytes to write in the designated slave module.

Figure 9:
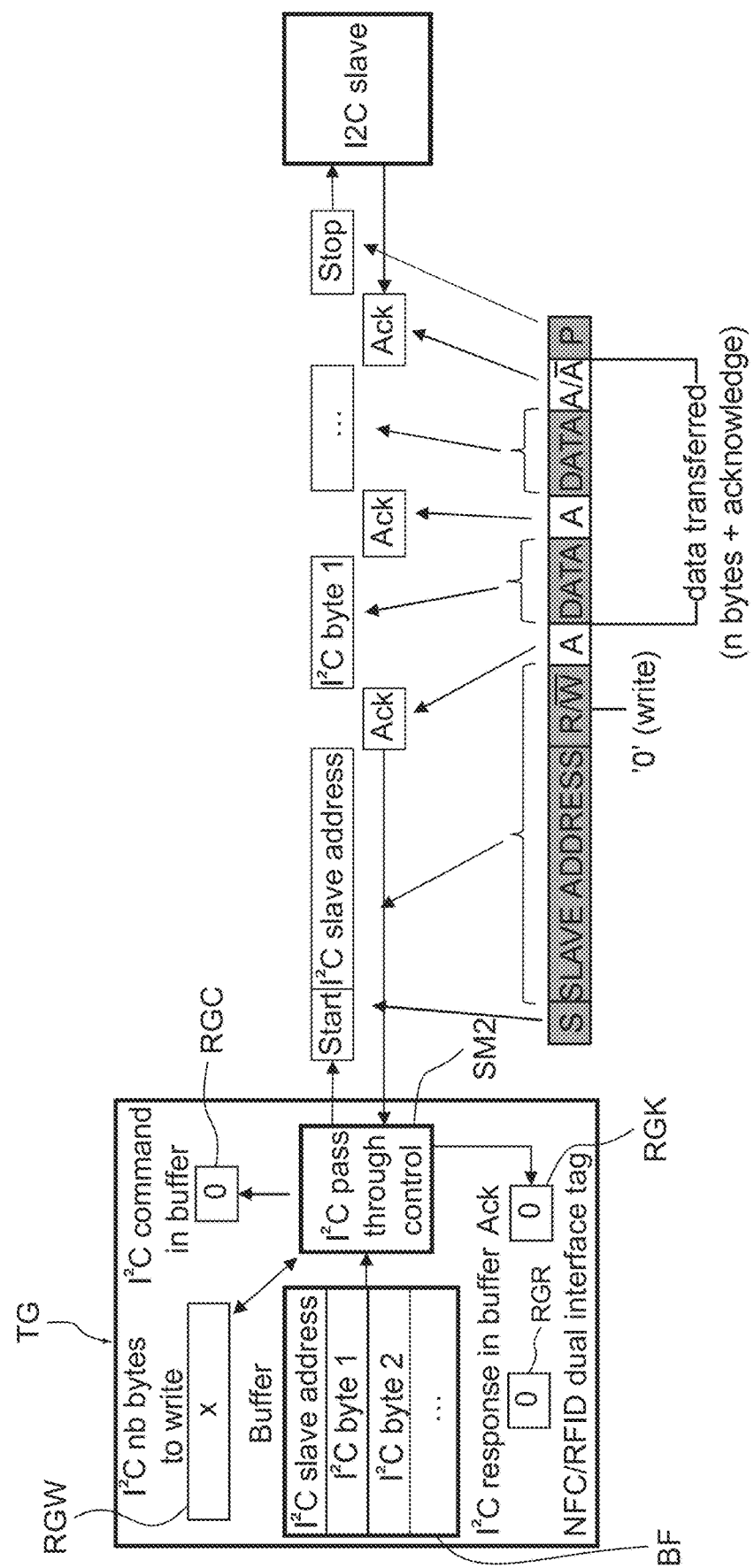

As illustrated in FIG. 9, the I²C pass-through state machine SM2 reads I²C bytes from buffer BF and sends them over the I²C bus to the corresponding slave module, adding signaling conditions (Start and Stop conditions).

This toggles the "I²C command in buffer" bit of the register RGC.

In other words the register RGC is reset to 0 by the state machine SM2.

The I²C pass-through state machine SM2 reads the Acknowledge bits from I²C bus sent by the I²C slave module and stores value 0 in the "Ack" register bit RGK.

Figure 10:
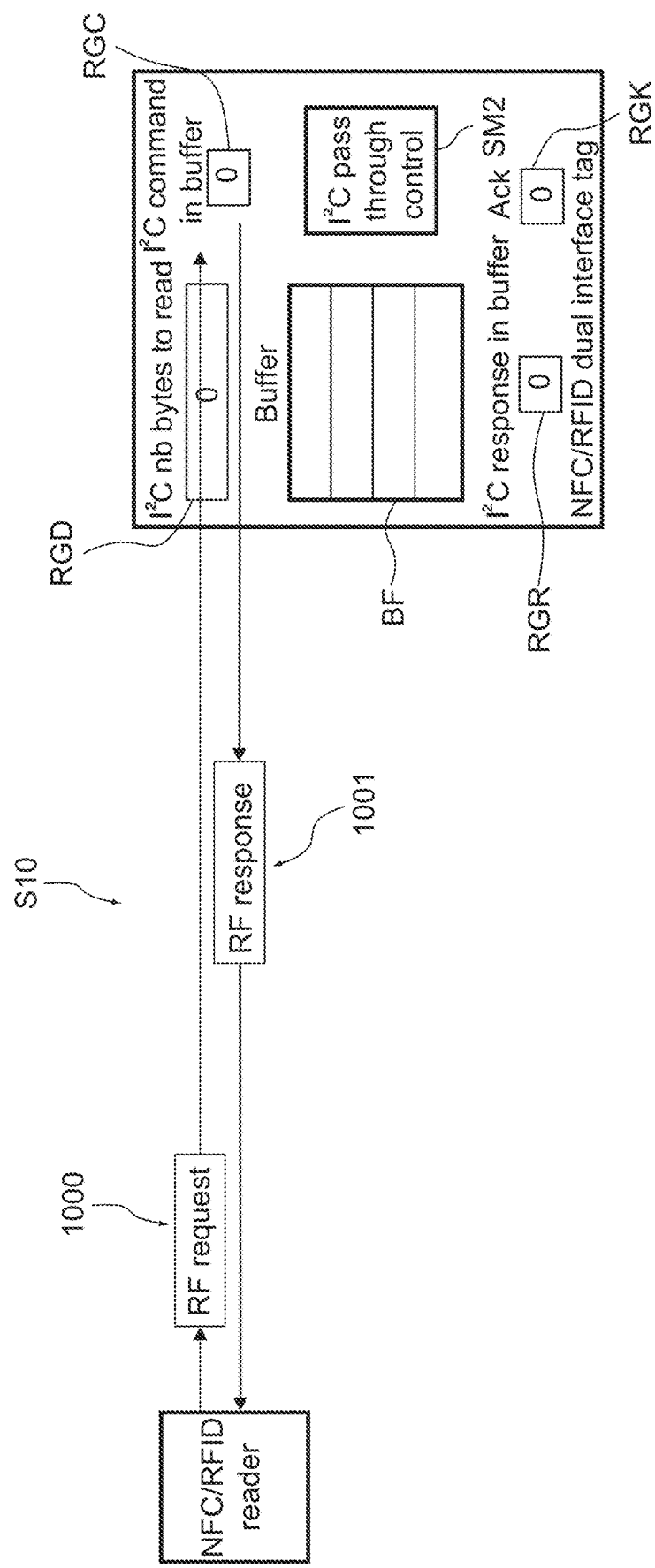

As illustrated in FIG. 10, the NFC/RFID reader RD sends (step S10) a RF read command 1000 to the NFC/RFID tag to check if I²C operation is terminated (polling).

Upon receipt of this RF read command 1000, the RF state machine SM1 reads reading the "I²C command in buffer" bit contained in the register RGC.

The value of this bit is sent to the reader RD via a RF response 1001 having a conventional structure compliant with the used RF protocol.

If the value of this bit is 0, the I²C write operation is over.

Figure 11:
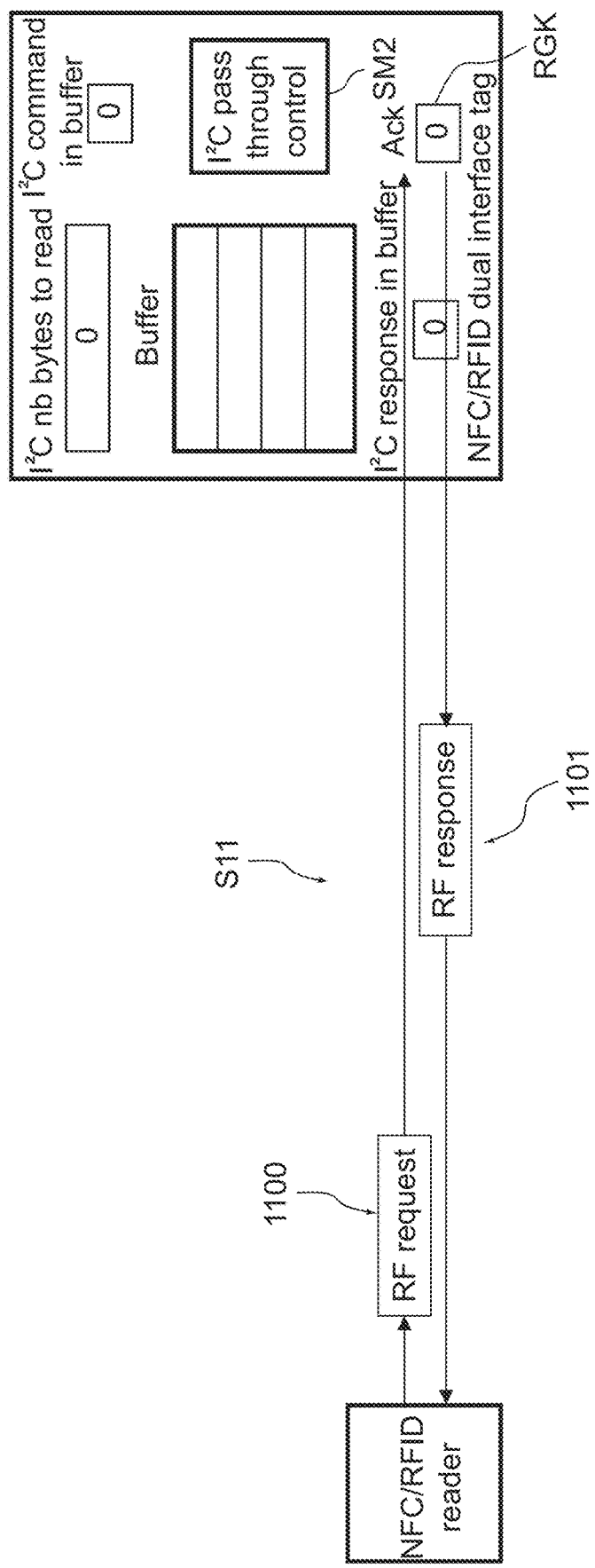

As illustrated in FIG. 11, the NFC/RFID reader RD sends (step S11) a RF read command 1100 to the NFC/RFID tag to read the Acknowledge bit value contained in the register RGK to check if I²C write operation was successful. The write operation is successful if the Acknowledge bit value is 0.

More precisely, this RF command 1100 is processed by the RF state machine SM1 which reads the value contained in the register RGK, sends it via a RF response 1101 to the reader RD and resets the value of the register RGK to the value 1.

FIGS. 12-17 explain an example of successive steps of a reading process of bytes into a slave module of the apparatus APP in order to be transmitted to the NFC/RFIG reader RD.

Figure 12:
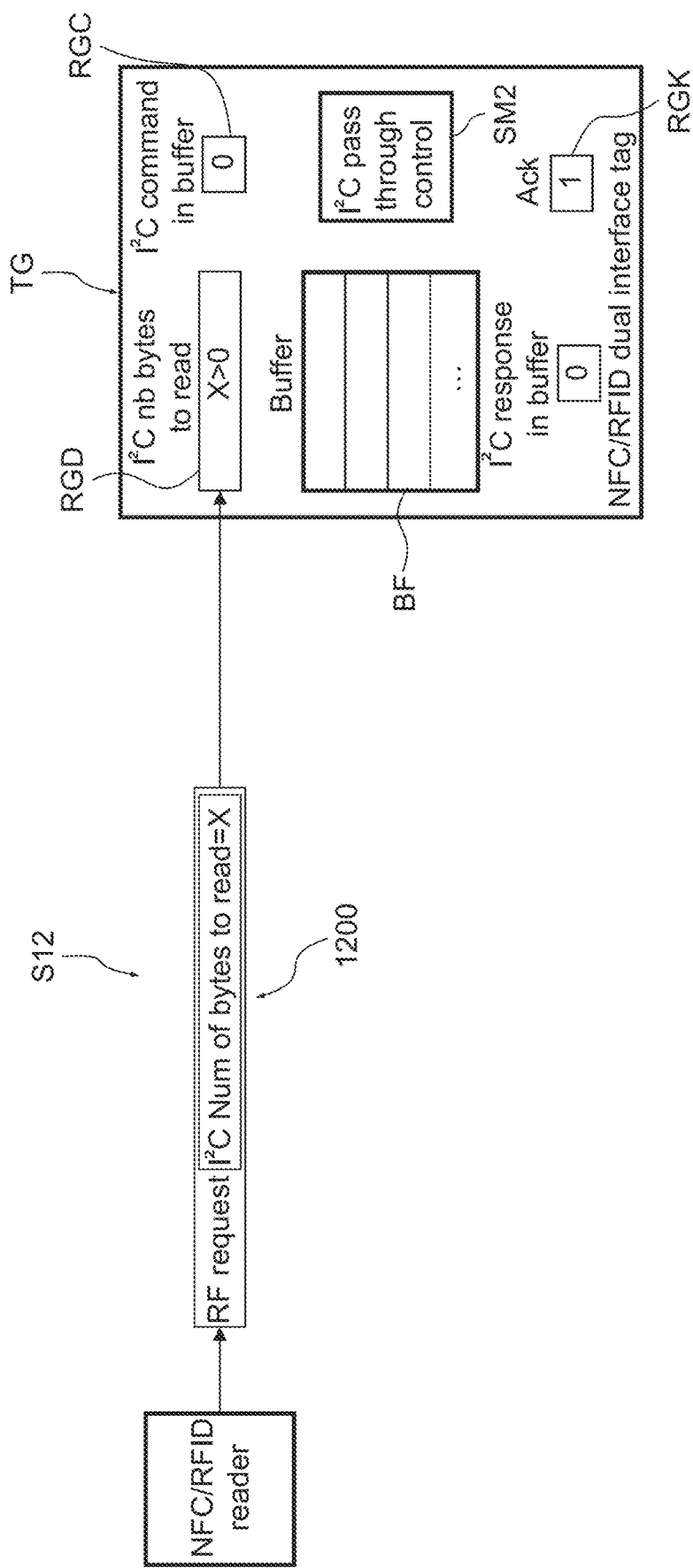

As illustrated in FIG. 12, the NFC/RFID reader RD sends (step S12) a RF command 1200 to the NFC/RFID tag to program the number X of I²C bytes to be read on the I²C bus. The value of X is greater than 0 (some byte to be read on I²C bus).

The RF command 1200 has a conventional structure compliant with the used RF protocol, and the number X of I²C bytes to be read is included in the data payload of the RF command 700.

This number X of I²C bytes to be read is extracted from the RF command by the state machine SM1 (RF pass through control) and written in the register RGD by the state machine SM1 also (RF pass through control).

The register RGC and the register RGR contain a 0 value while the register RGK contains a 1 value.

Figure 13:
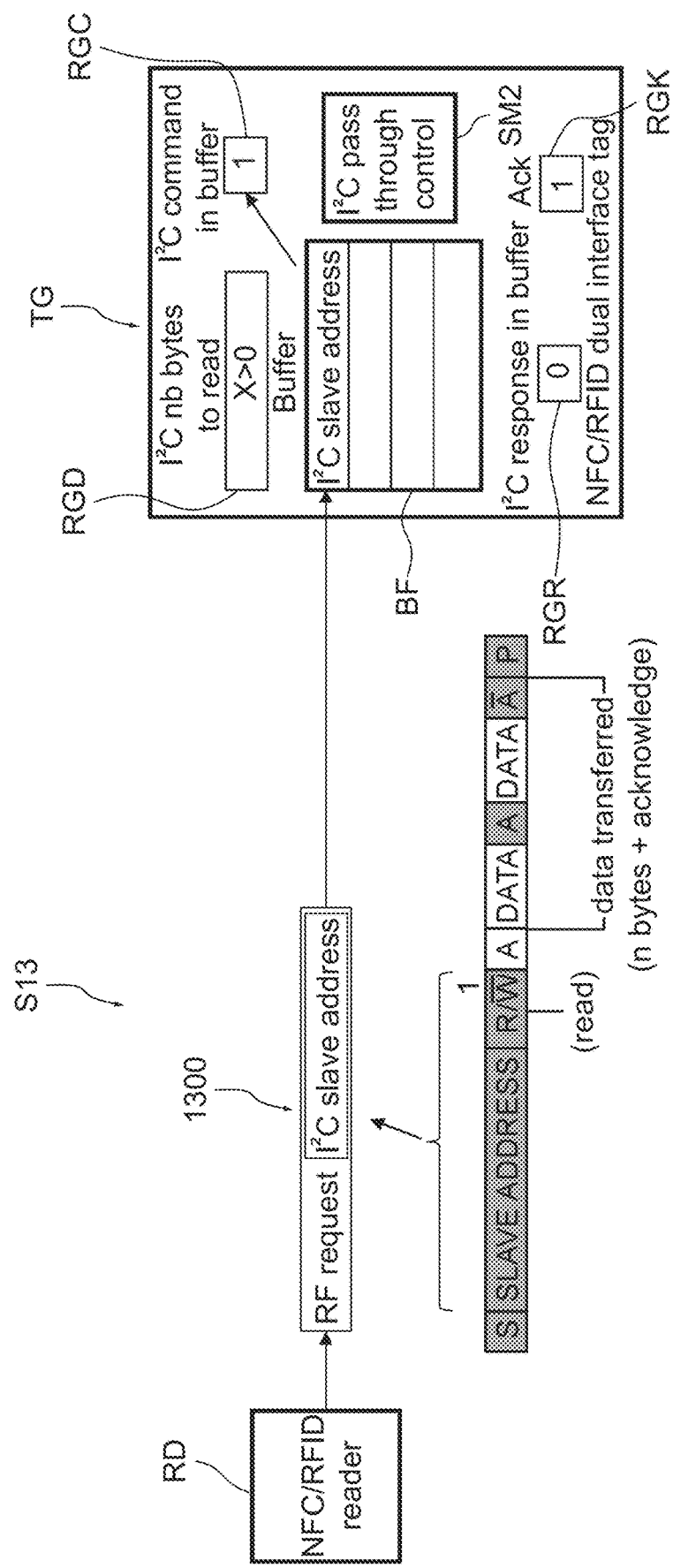

As illustrated in FIG. 13, the NFC/RFID reader RD sends (step S13) a write command 1300 to the NFC/RFID tag TG.

This RF command 1300 contains the I²C slave address of the slave module intended to be read.

The I²C slave address form a complete I²C message intended for being delivering to the I²C bus but without I²C signaling information, i.e. without here the start and stop conditions.

The I²C slave address includes the R/W bit which is set to "read".

This toggles the "I²C command in buffer" bit of the register RGC.

In other words the register RGC is set to 1 by the state machine SM1 (RF pass through control).

The state machine SM1 (RF pass through control) stores the I²C slave address into the buffer BF.

Figure 14:
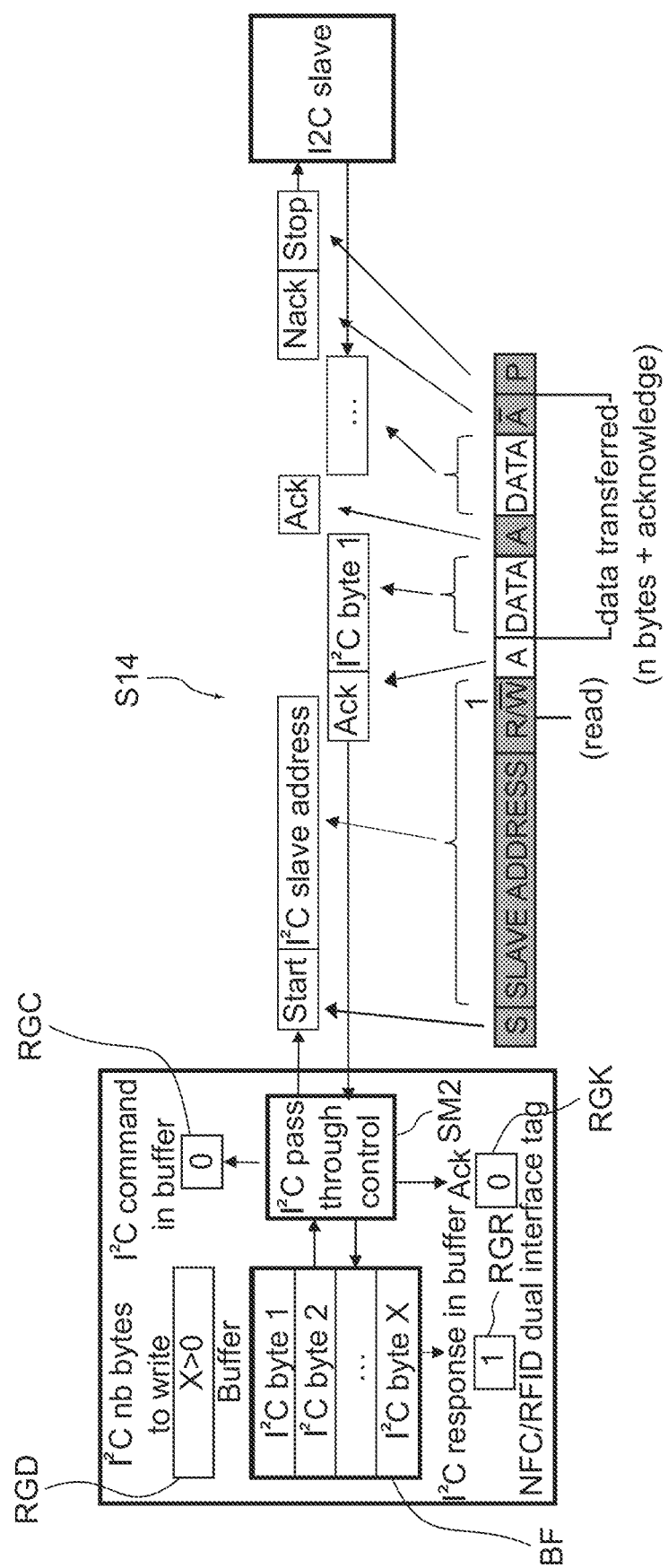

As illustrated in FIG. 14, the I²C pass-through state machine SM2 reads I²C slave address byte from buffer BF and sends it over the I²C bus through I²C interface INT2, adding signaling information (Start conditions and acknowledgment bits Acks).

This toggles the "I²C command in buffer" bit of the register RGC.

In other words the register RGC is reset to 0 by the state machine SM2. The I²C pass-through state machine SM2 reads the Acknowledge bit Ack from I²C bus and store value 0 in the "Ack" register bit RGK.

The I²C pass-through state machine reads all bytes from 1 to X from I²C bus, store them in the buffer BF, and sends Acks, Nack and Stop condition.

This toggles the "I²C response buffer" bit of the register RGR.

In other words the register RGR is set to 1 by the state machine SM2.

Figure 15:
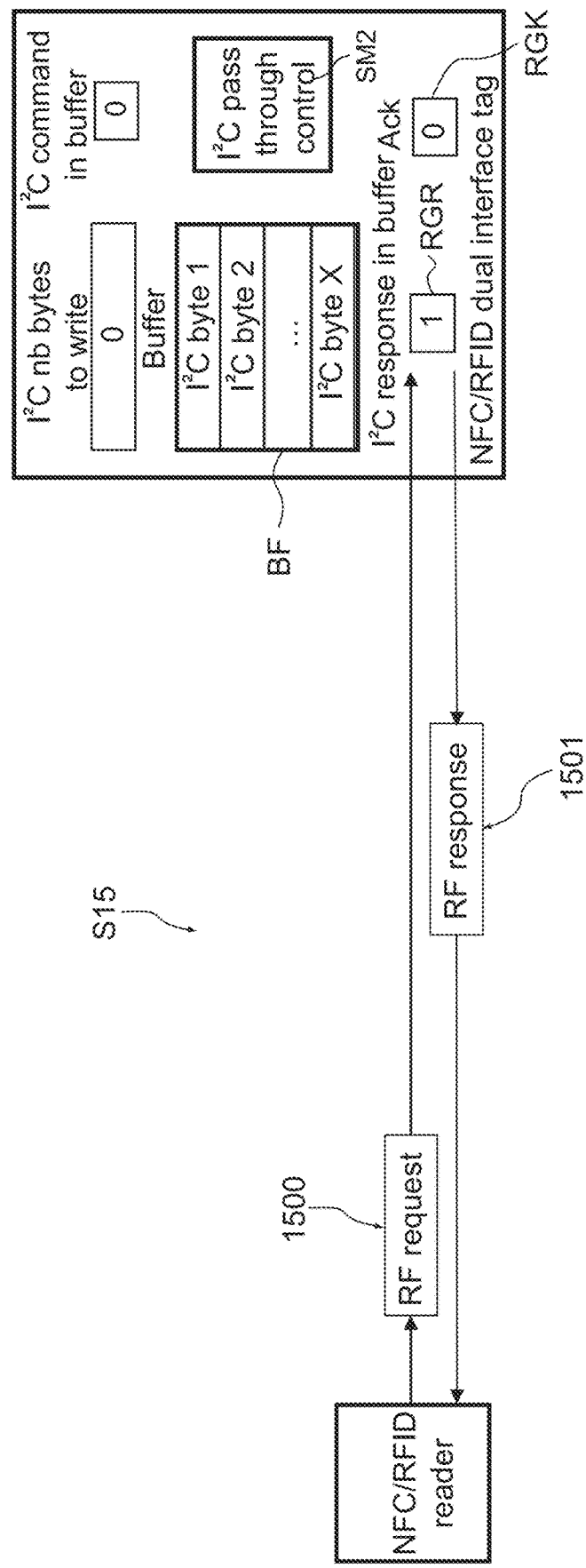

As illustrated in FIG. 15, the NFC/RFID reader RD sends (step S15) a read command 1500 to the NFC/RFID tag TG to check if I²C operation is terminated (polling).

Upon receipt of this RF read command 1500, the RF state machine SM1 reads reading the "I²C response in buffer" bit contained in the register RGR.

The value of this bit is sent to the reader RD via a RF response 1501 having a conventional structure compliant with the used RF protocol.

If the value of this bit is 1, then read operation is over.

Figure 16:
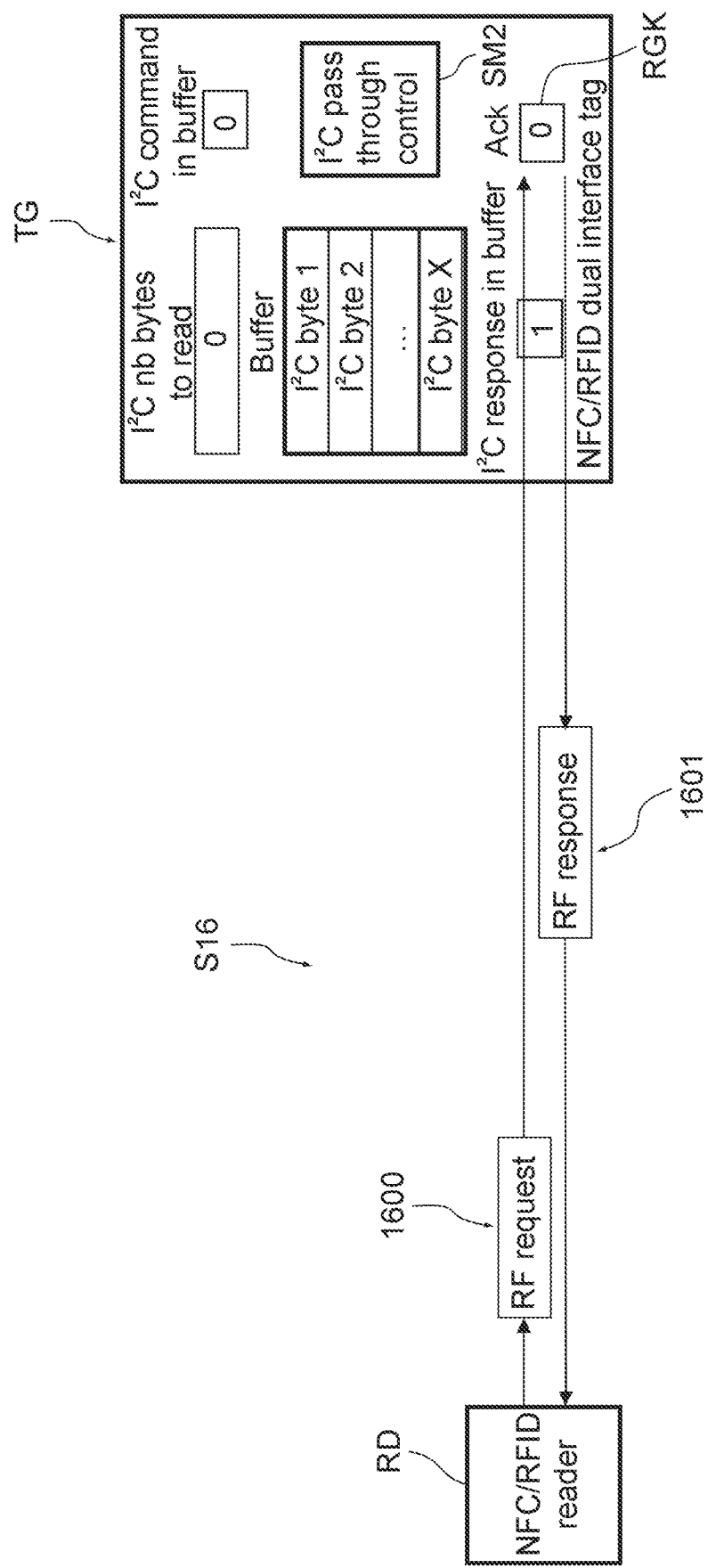

As illustrated in FIG. 16, the NFC/RFID reader RD sends (step S16) a read command 1600 to the NFC/RFID tag to read the Acknowledge bit value contained in the register RGK to check if the slave module select operation was successful.

The slave module select operation is successful if the Acknowledge bit value is 0.

More precisely, this RF command 1600 is processed by the RF state machine SM1 which reads the value contained in the register RGK, sends it via a RF response 1601 to the reader RD and resets the value of the register RGK to the value 1.

Figure 17:
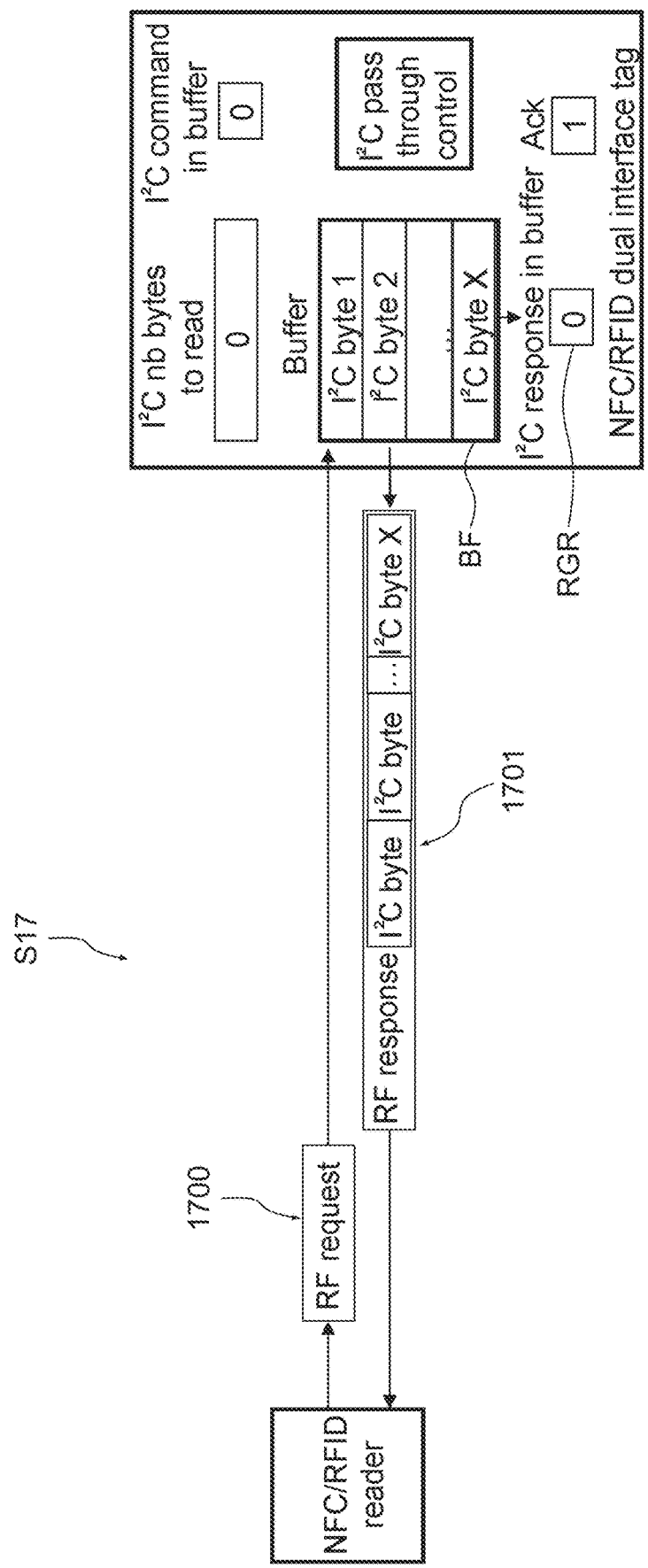

As illustrated in FIG. 17, the NFC/RFID reader RD sends (step S17), a read command 1700 to the NFC/RFID tag TG to read the I²C bytes response contained in the buffer BF.

More precisely, this RF command 1700 is processed by the RF state machine SM1, which then sends the I²C byte1-I²C byteX in the payload data of a RF response 1601 to the reader RD and toggles the value of the register RGR to the value 0.

As it can be seen from explanations related to FIGS. 7-17, the registers RGD, RGW, RGC, RGR, RGK contain control (called also configuration) data (one or several bits) which permit for example to determine the presence or the absence of an operation to be executed, the type of operation (write or read operation) or the status of the operation (terminated for example) or the result of the operation (successful for example).

Those control registers are read and/or written
by the RF state machine SM1 upon reception of a RF command (request) sent by the reader, or
by the I²C state machine SM2.

More precisely, registers RGD, RGW and RGC are written by the RF state machine SM1.

For example if the register RGC contains value 0, it means that there is no I²C command to be executed by the I²C state machine SM2.

If the register RGC contains value 1, it means that there is an I²C command to be executed by the I²C state machine SM2, this command being either a write operation or a read operation.

The type of operation (read or write) is determined by the contents of registers RGD and RGW.

More precisely if the value contained in the register RGD is nul and the value contained in the register RGW in not nul, the operation requested by the reader is a write operation.

If the value contained in the register RGW is nul and the value contained in the register RGD in not nul, the operation requested by the reader is a read operation.

The register RGW and the register RGD are also read by the state machine SM2 to know the number of bytes to write or read in the designated slave module.

The register RGC is also read by the state machine SM2 to know if a command is to be executed on the bus and also written by the state machine SM2 when the execution of the command has started.

The register RGC is also read by the state machine SM1 upon request of the reader to know if the execution of a requested command is terminated.

The register RGR is written by the state machine SM2 to indicate that read bytes are stored in the buffer BF, and the register RGR is also read by the state machine SM1 upon request of the reader to check if the I²C read operation is terminated.

The register RGK (for example initially set to 1) is written by the state machine SM2 upon reception of Ack bits, read by the state machine SM1 upon request of the reader RD to check whether the read or write operation is successful, and reset to 1 by the state machine SM1.

Among those control data, the data contained in registers RGD and RGW are first control data sent within or deduced from the data payload of the commands sent by the reader and defining if a command from the reader is a write operation or a read operation in the designated slave module.

The data contained in register RGC is a control data defining the presence or the absence of an operation to be executed on said bus.

The data contained in register RGC is also a control data indicating whether the execution of a write operation requested by the reader is terminated and the data contained in register RGR is a control data indicating whether the execution of a read operation requested by the reader is terminated.

The data contained in register RGR is also a control data indicating whether the result of a read operation requested by the reader is stored in the transponder.

The data contained in the register RGK is a control data indicating whether a read or write operation requested by the reader is successful.

Figure 18:
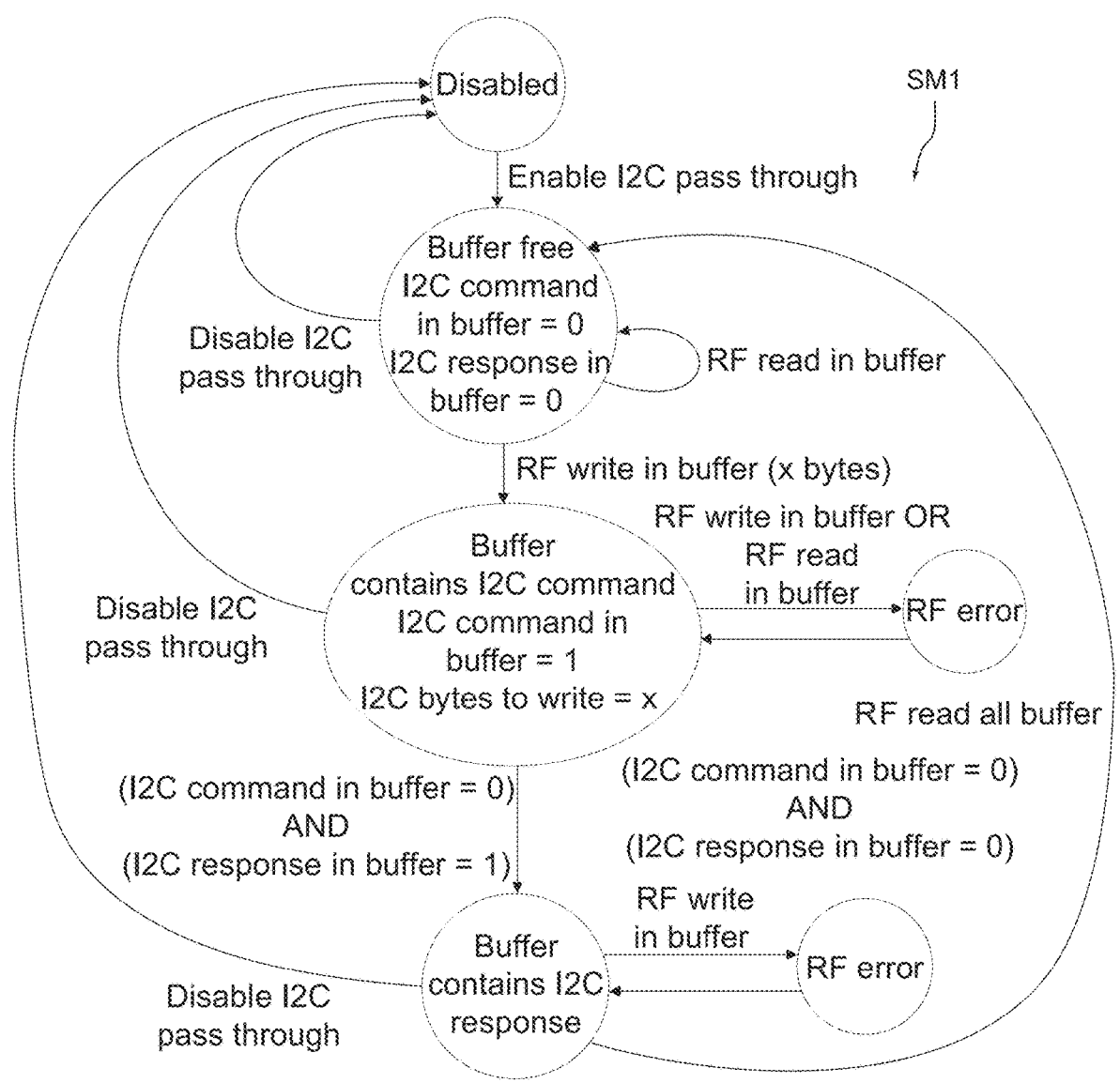
Figure 19:
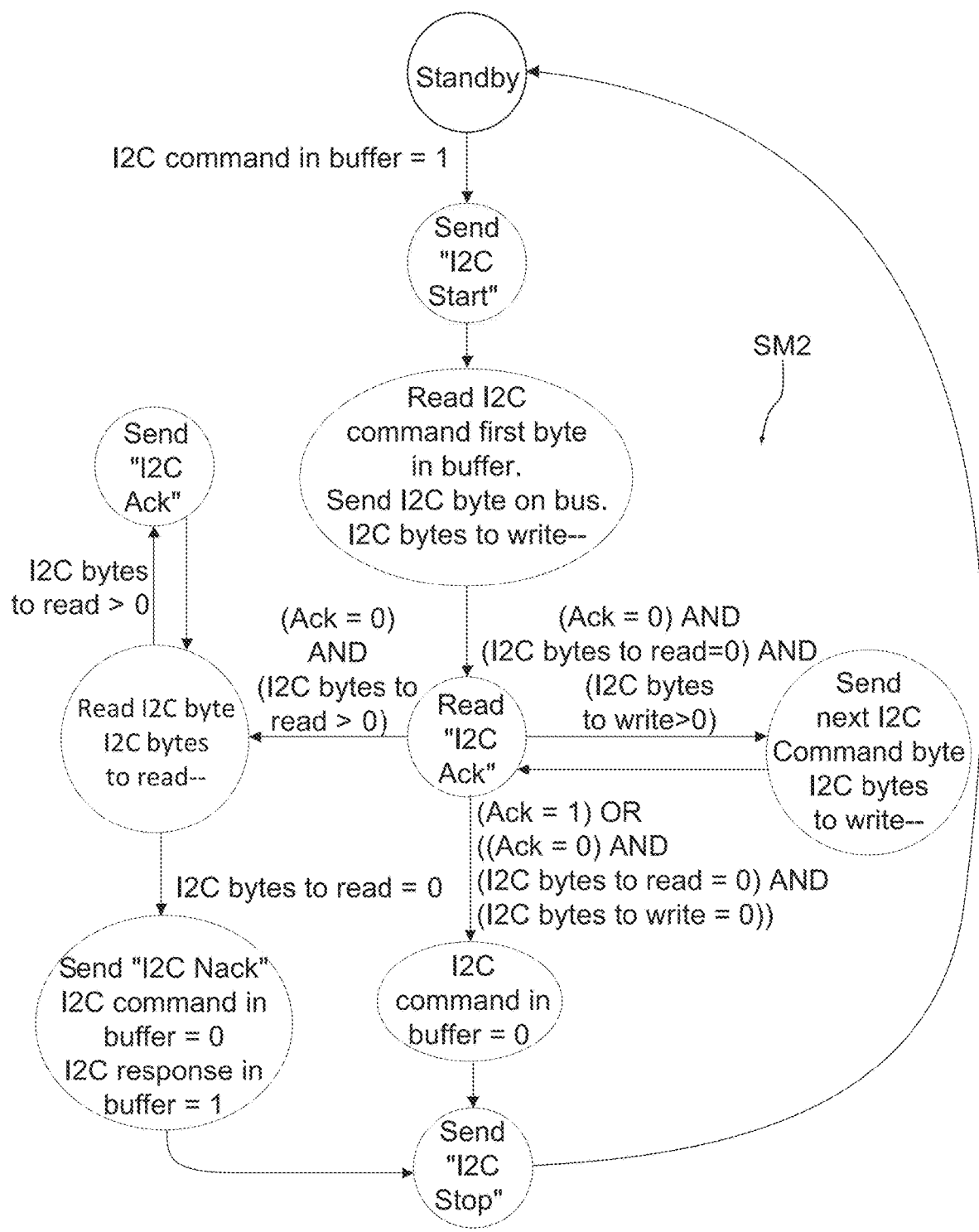

FIG. 18 details an example of the RF pass through state machine SM1 and FIG. 19 details an example of I²C pass through state machine SM2, both permitting to implement the steps disclosed in FIGS. 7-17.

FIGS. 20-25 illustrate examples of apparatuses according to embodiments using an I²C bus and a contactless transponder or tag according to embodiments, for example a tag or contactless transponder referenced ST25DV within the STMicroelectronics company having an integrated circuit modified for incorporating means of the embodiments.

Figure 20:
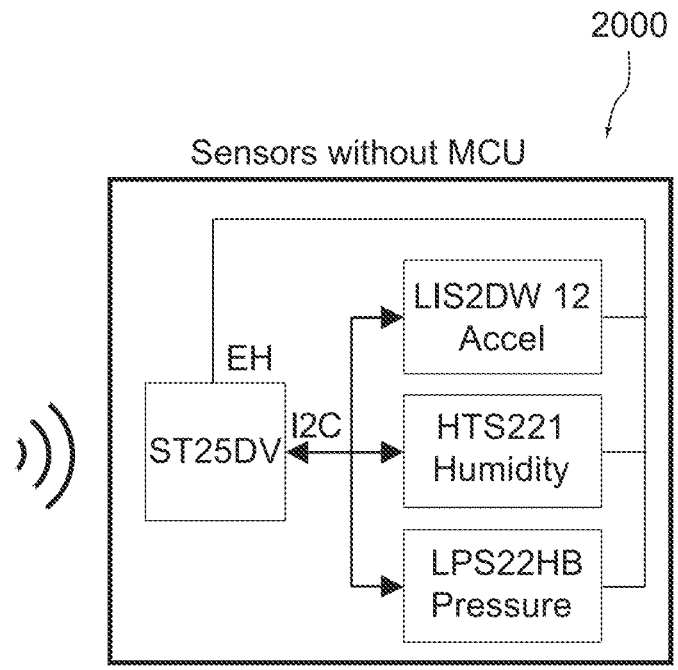
Figure 21:
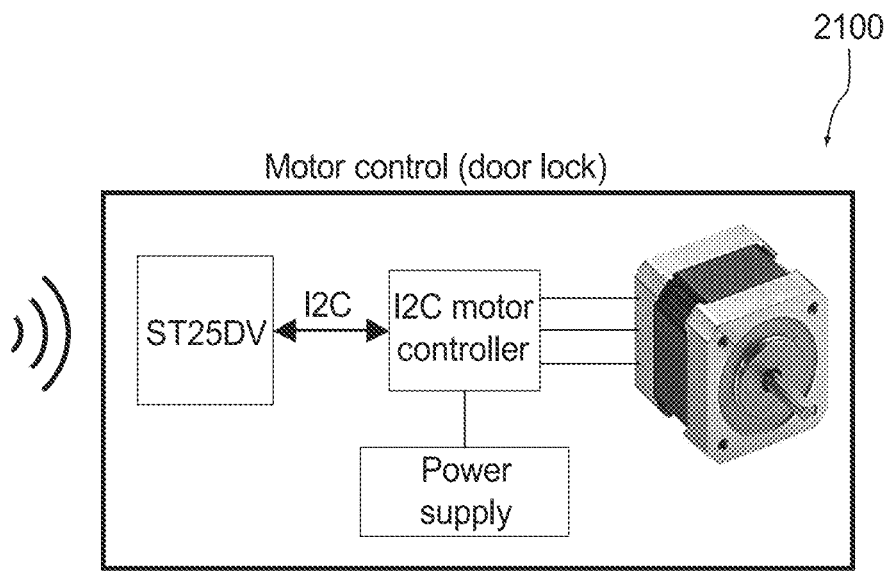
Figure 22:
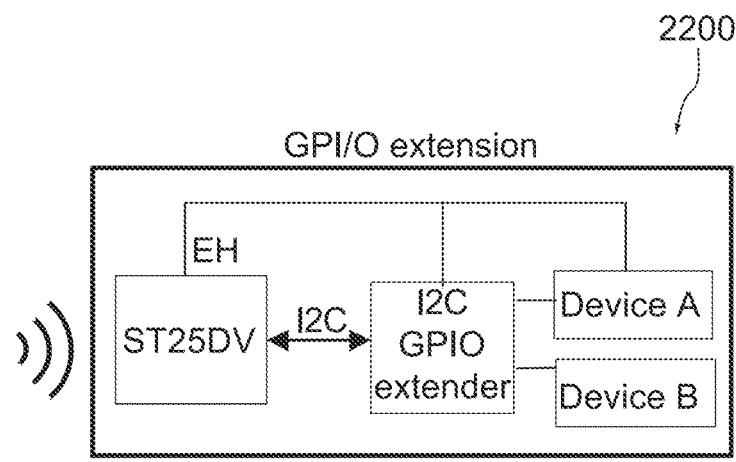
Figure 23:
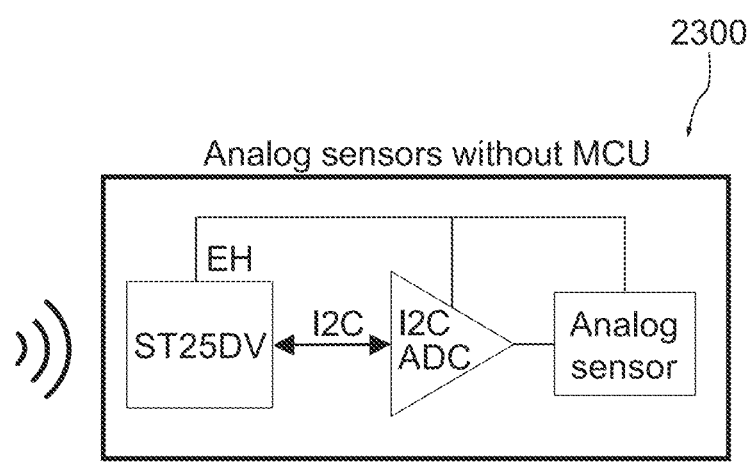
Figure 24:
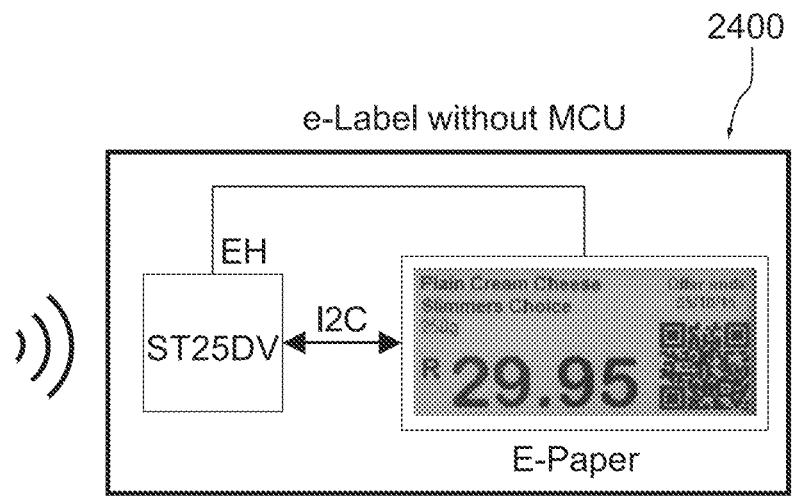
Figure 25:
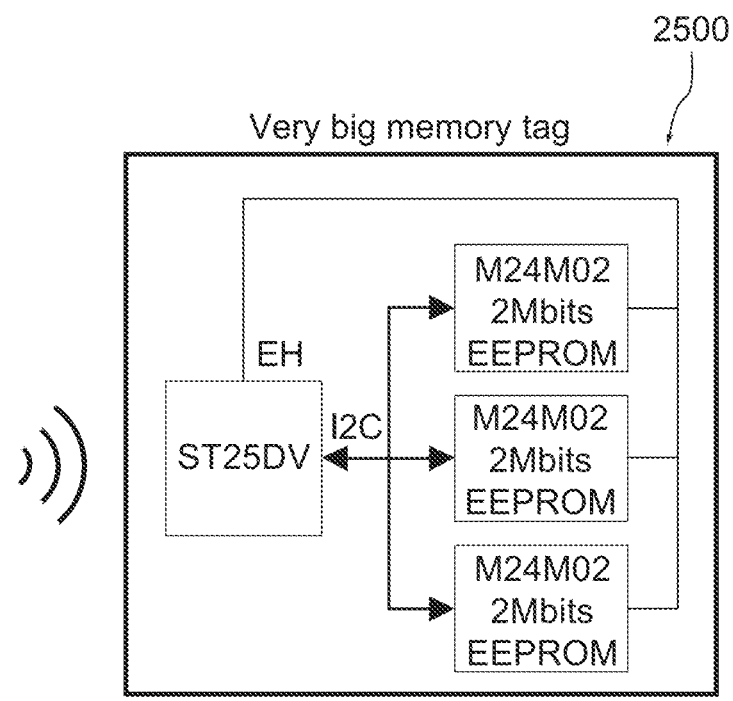

More precisely, FIG. 20 illustrates a sensor 2000 without MCU (microcontroller). FIG. 21 illustrates a door lock 2100. FIG. 22 illustrates GPI/O extension 2200. FIG. 23 illustrates an analog sensor 2300 without MCU. FIG. 24 illustrates e-Label 2400 without MCU. FIG. 25 illustrates a very big memory tag 2500.

The embodiments are not limited to the above examples, but can be extended to other RFID technologies: UHF (ISO18000-6, ISO18000-63, EPC Gen2).

Further embodiments can be extended to other bus protocols.

An example of another possible protocol is SPI (Serial Peripheral Interface) (half duplex transmission.

or full duplex transmission) will be now explained more in details.

Figure 26:
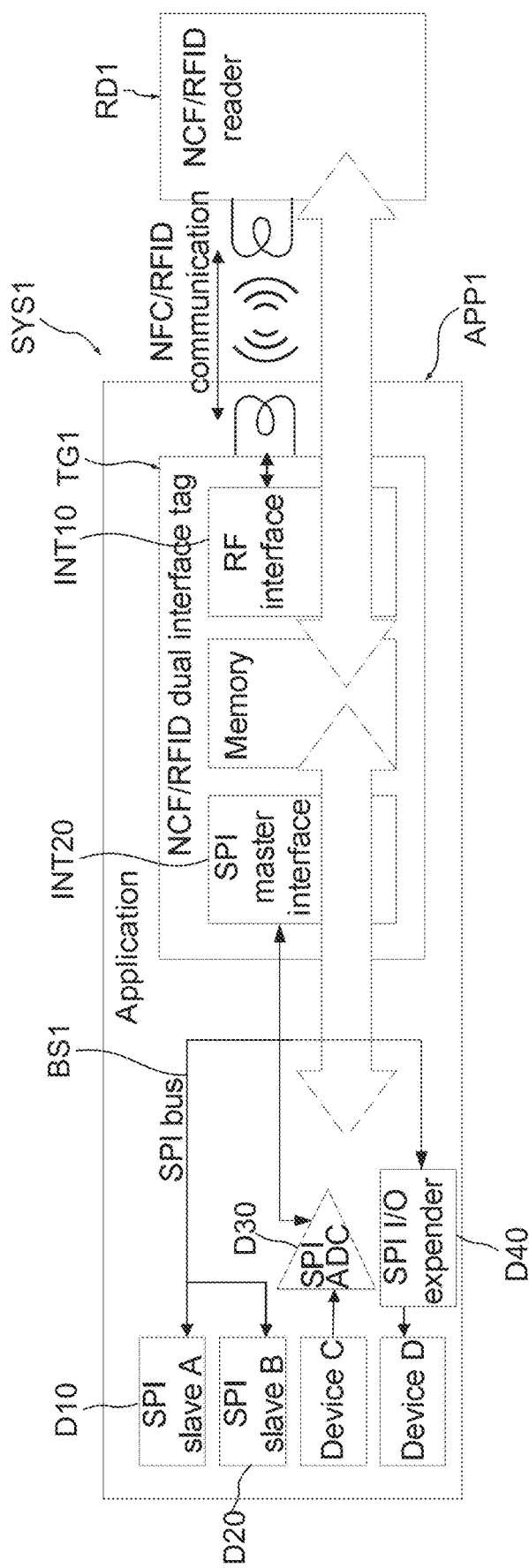
FIGS. 26-52 illustrate embodiments using a SPI bus.

As shown on FIG. 26, which illustrates an example of a system SYS1 according to embodiments, a NFC/RFID reader RD1 can act as the SPI master of the application or apparatus APP1, in place of a microcontroller.

In other words the reader RD1 is configured to directly communicate with slave modules D10-D40 of the apparatus APP1 through a contactless interface INT10 of a NFC/RFID dual interface transponder (or tag) TG1, i.e. without passing through any microcontroller.

Although the reader RD1 is not directly connected to the SPI bus BS1, the reader RD1 can be considered to be actually the master of the application or the master on the SPI bus, because it initiates commands within RF frames, and those commands will be transformed into SPI commands the SPI bus consistent with the SPI protocol.

The SPI interface INT20 of the tag, which is actually connected to the SPI bus BS1, is a master interface.

Thus it can be also said that the reader is the master on the bus BS1 through the SPI master interface INT20.

Figure 27:
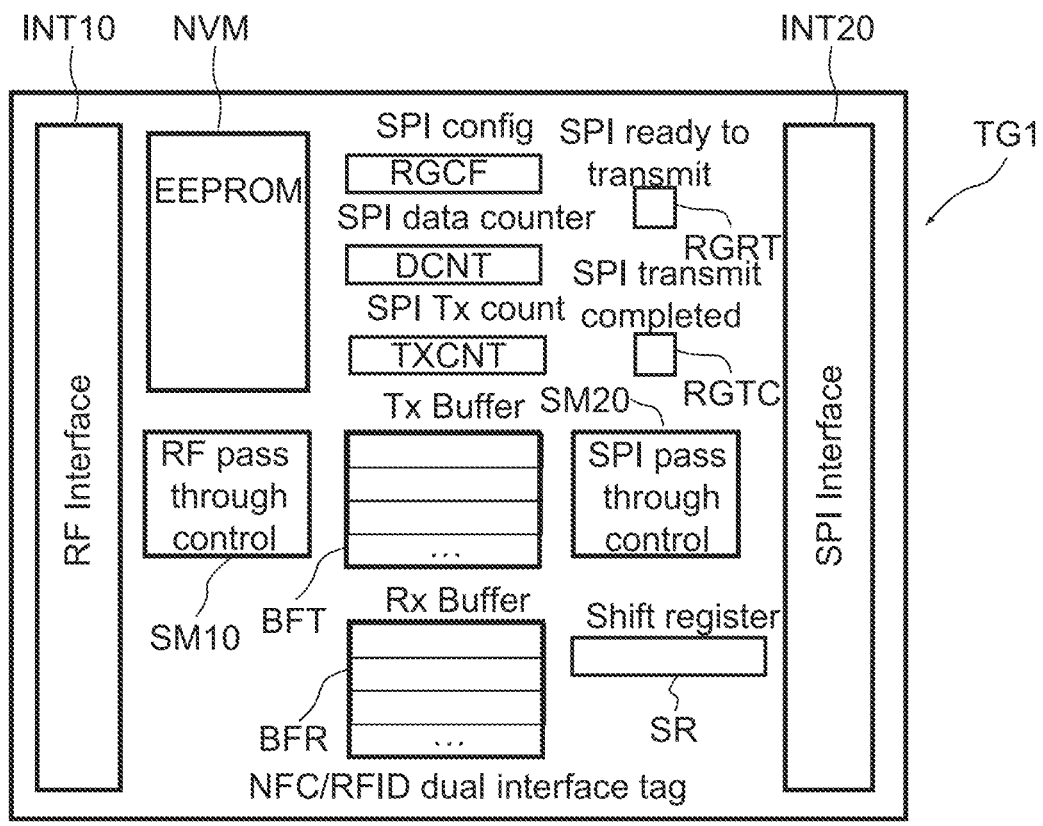

As shown on FIG. 27, an example of a NFC/RFID dual interface transponder (or tag) TG1 according to embodiments integrates:

First volatile memory means including a transmission (Tx) buffer (FIFO) BFT to store SPI bytes to be transmitted, and a reception (Rx) buffer (FIFO) BFR to store received SPI bytes;

Second volatile memory means including a plurality of registers, for example the following ones:

A register RGCF to store SPI configuration (clock phase/polarity, clock speed, bits order, full/half duplex transmission mode);

A register (counter) DCNT to store the total number of SPI bytes to transmit and receive;

A register (counter) TXCNT to store the number of bytes to transmit in half duplex transmission mode;

A shift register SR to store transmit and received data in full-duplex;

A register RGRT to store a bit to signal the SPI is ready to transmit (Tx buffer has been filled);

A register RGTC to store a bit to signal the SPI transmit/receive is completed (Tx buffer BIT has been emptied, Rx buffer BFR has been filled);

A first state machine SM10 for contactless (RF) pass through control;

A second state machine SM20 for SPI pass through control.

The SPI protocol is well known by the man skilled in the art.

Figure 28:
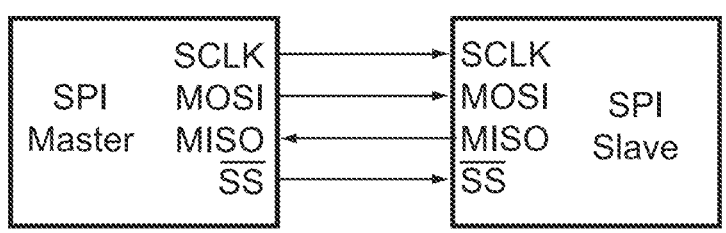
Figure 29:
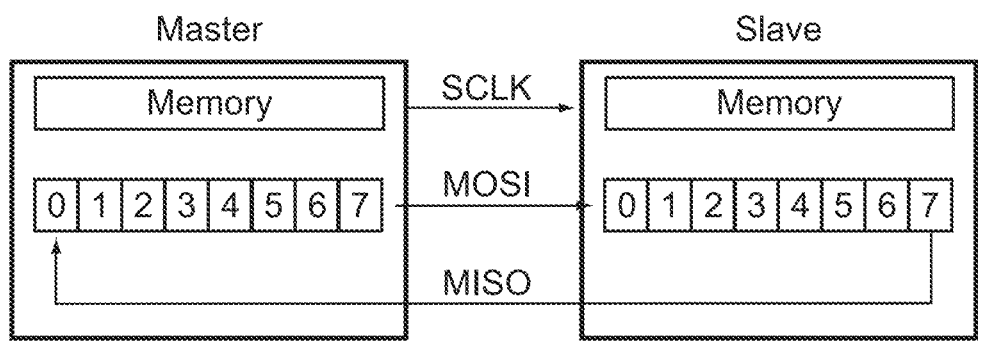
Figure 30:
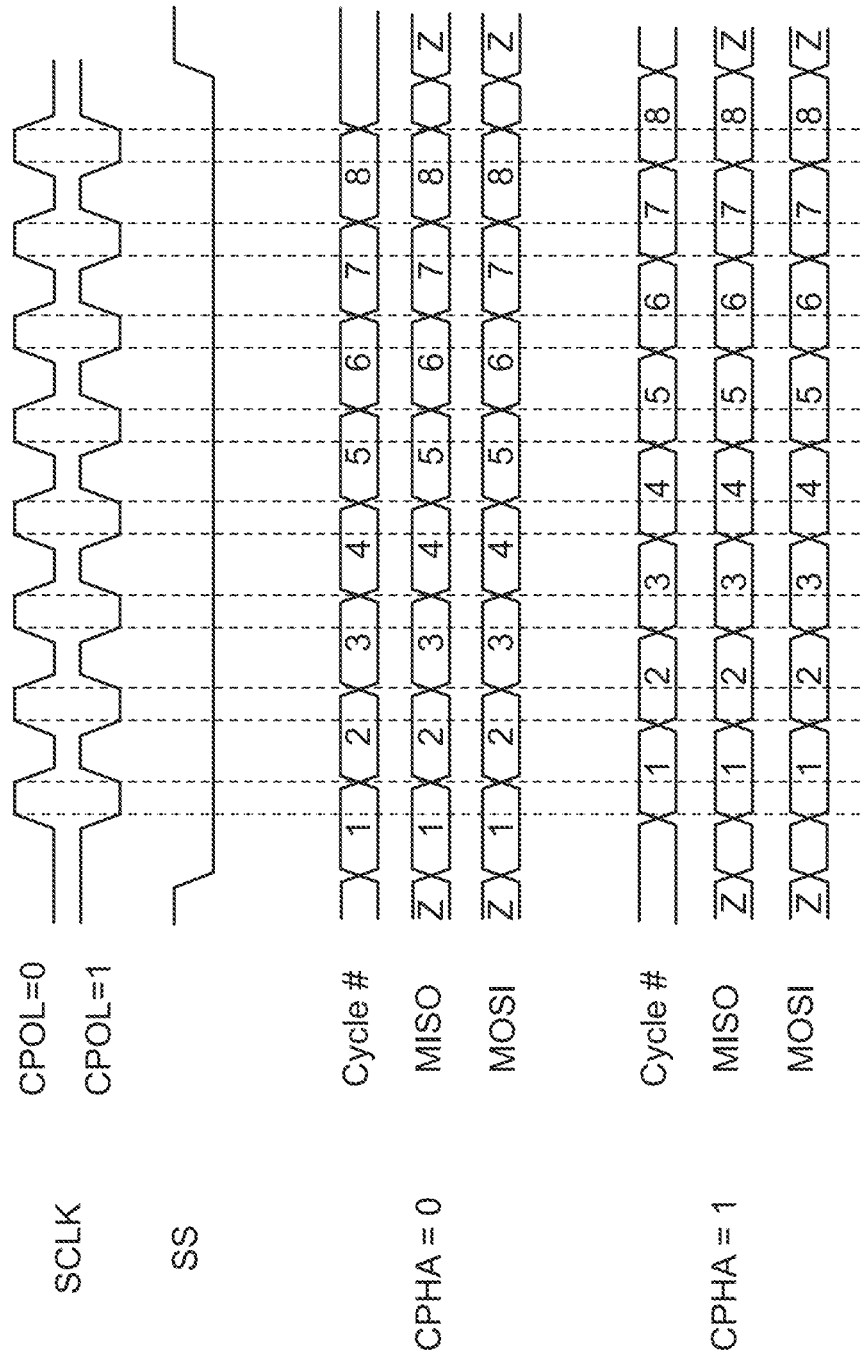

Some features of the SPI protocol are reminded thereafter in relation with FIGS. 28-30.

As illustrated in FIG. 28, the master is connected to one or more slaves through 4 (in a full-duplex transmission mode) or more lines:

SCLK: clock.

MOSI: Master Output Slave Input to transmit data to a slave.

MISO: Master Input Slave Output to receive data from a slave.

SS: Slave Select line, (active low to select the slave).

In half-duplex transmission mode (so called 3 wire mode), data is transmitted and received on the same line (MOSI=MISO).

As mentioned above, SPI can be set up to operate with a single master and a single slave, and it can be set up with multiple slaves controlled by a single master. There are two ways to connect multiple slaves to the master. If the master has multiple slave select pins, the slaves can be wired in parallel. If only one slave select pin is available, the slaves can be daisy-chained.

The clock signal SCLK synchronizes the output of data bits from the master to the sampling of bits by the slave. One bit of data is transferred in each clock cycle, so the speed of data transfer is determined by the frequency of the clock signal. SPI communication is always initiated by the master since the master configures and generates the clock signal.

The master can choose which slave it wants to talk to by setting the slave's SS line to a low voltage level. In the idle, non-transmitting state, the slave select line is kept at a high voltage level.

The master sends data to the slave bit by bit, in serial through the MOSI line. The slave receives the data sent from the master at the MOSI pin. Data sent from the master to the slave is usually, but not compulsorily, sent with the most significant (MSB) bit first.

The slave can also send data back to the master through the MISO line in serial. The data sent from the slave back to the master is usually sent with the least significant (LSB) bit first.

Data is only valid during SS low.

As illustrated on FIG. 29, the SPI bus is full duplex based on exchange of data in a shift register.

Bits from the master shift register are pushed into the slave shift register.

Bits from the slave shift register are pushed in the master shift register at the same time.

As illustrated in FIG. 30, data is sampled on SCLK, with configurable phase CPHA and polarity CPOL.

More precisely, the clock signal SCLK in SPI can be modified using the properties of clock polarity and clock phase. These two properties work together to define when the bits are output and when they are sampled. Clock polarity can be set by the master to allow for bits to be output and sampled on either the rising or falling edge of the clock cycle. Clock phase can be set for output and sampling to occur on either the first edge or second edge of the clock cycle, regardless of whether it is rising or falling.

The steps for SPI data transmission are the following ones:

The master outputs the clock signal; The master switches the SS pin to a low voltage state, which activates the slave; The master sends the data one bit at a time to the slave along the MOSI line. The slave reads the bits as they are received; If a response is needed, the slave returns data one bit at a time to the master along the MISO line. The master reads the bits as they are received.

FIGS. 31 to 36 illustrate an example of a SPI full duplex transmission mode implemented by the system SYS1 according to embodiments.

Figure 31:
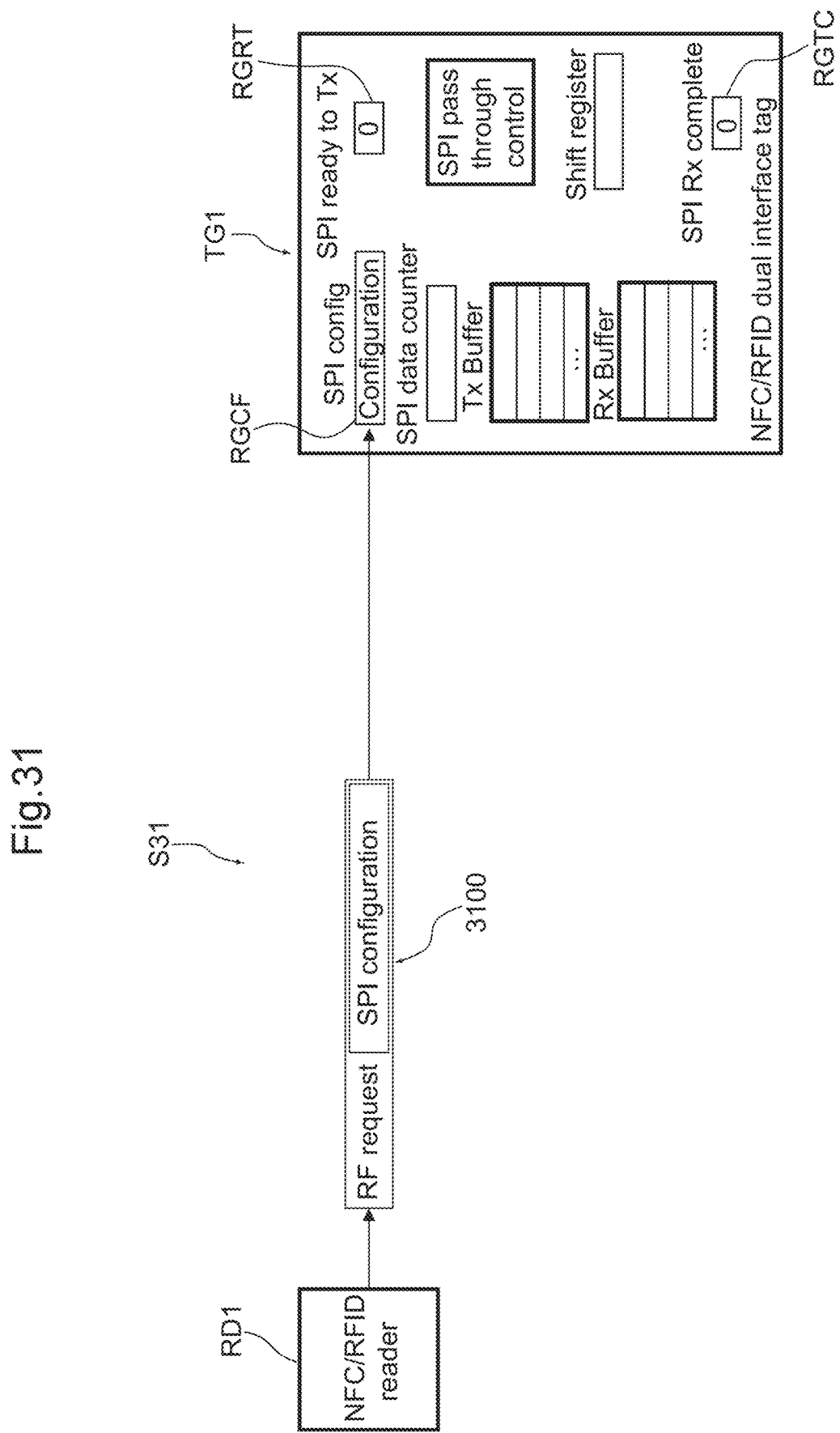

As illustrated in FIG. 31, the NFC/RFID reader RD1 sends (step S31) a RF write command 3100 to the NFC/RFID tag to configure the SPI bus by writing the SPI configuration into the SPI configuration register RGCF.

SPI configuration contains the following information:

CLKPOL: clock polarity to be used,

CLKPH: clock phase to be used,

CLK freq: clock frequency to be used,

Bit Polarity: to select if shift register is sending data MSB first or LSB first, Full/Half duplex mode selection (here full duplex mode).

The RF command 3100 has a conventional structure compliant with the used RF protocol, and the configuration information is included in the data payload of the RF command 3100.

This configuration information is extracted from the RF command by the state machine SM10 (RF pass through control) and written in the register RGCF by the state machine SM10 also (RF pass through control).

The register RGRT and the register RGTC contain a 0 value.

Figure 32:
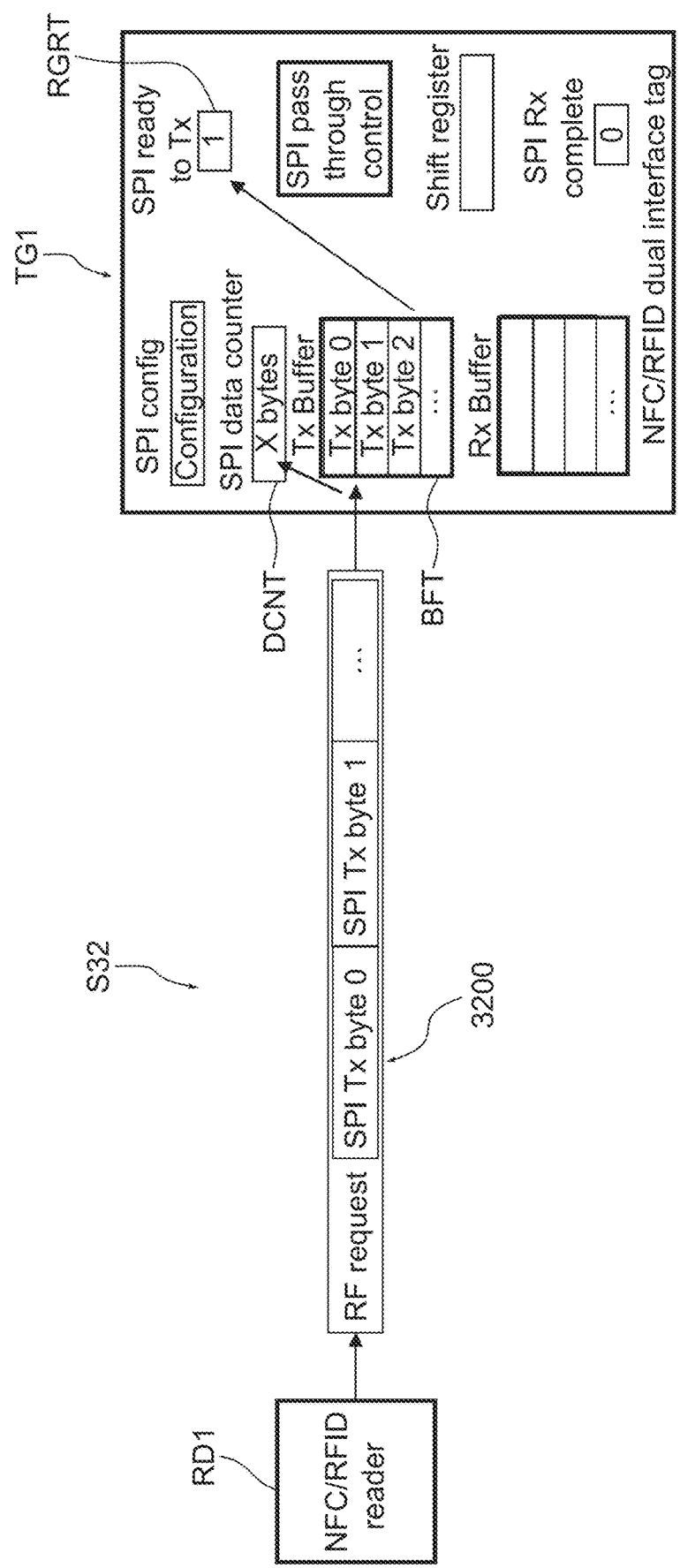

As illustrated in FIG. 32, the NFC/RFID reader RD1 sends (step S32) a RF write command 3200 to the NFC/RFID tag TG1.

This RF command 3200 contains SPI bytes to be transmitted on SPI bus.

This toggles the "SPI ready to Tx" bit of the register RGRT

In other words the register RGRT is set to 1 by the state machine SM10 (RF pass through control).

The state machine SM10 (RF pass through control) updates the counter DCNT with the number X of bytes to transmit on the SPI bus and writes into Tx buffer the X SPI bytes to be transmitted.

Figure 33:
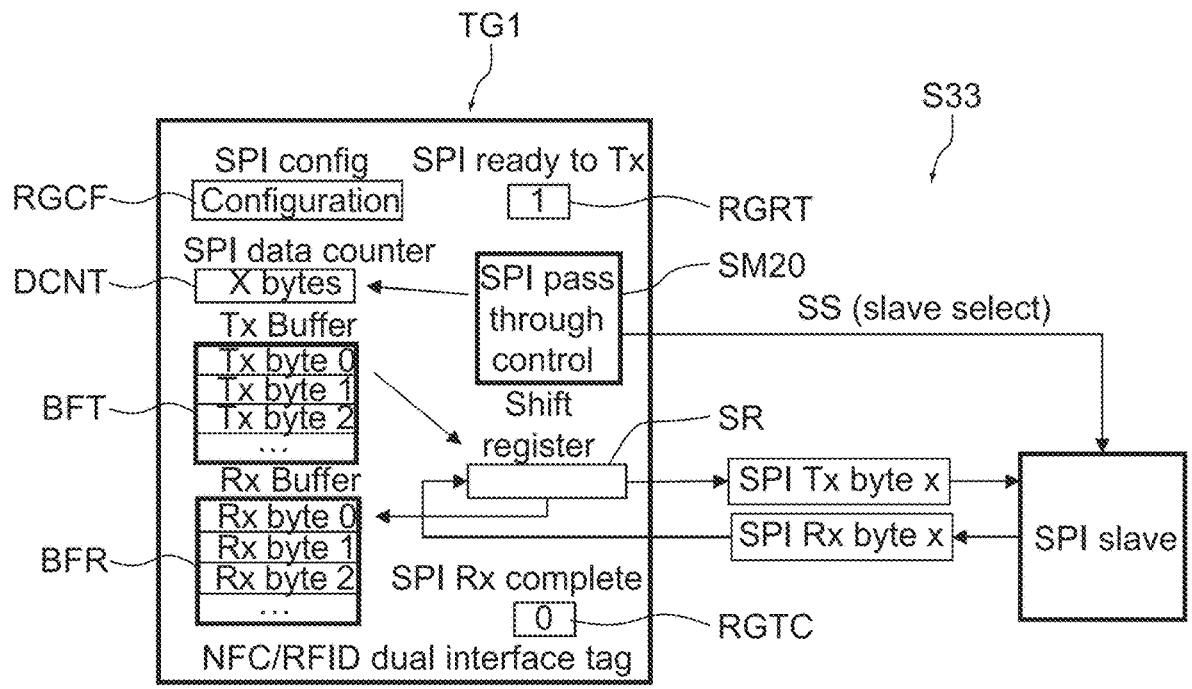

As illustrated in FIG. 33, once SPI Tx ready bit contained in register RGRT is set to 1, the SPI pass-through state machine SM20 does (step S33):

select the slave device by setting SS line low, copy SPI bytes from Tx buffer BFT to the shift register SR and send them on the MOSI line to the slave, read the MISO line from the slave and copy the SPI received bytes from the shift register SR into the Rx buffer BFR, decrease SPI data counter DCNT and loop until it is null.

Figure 34:
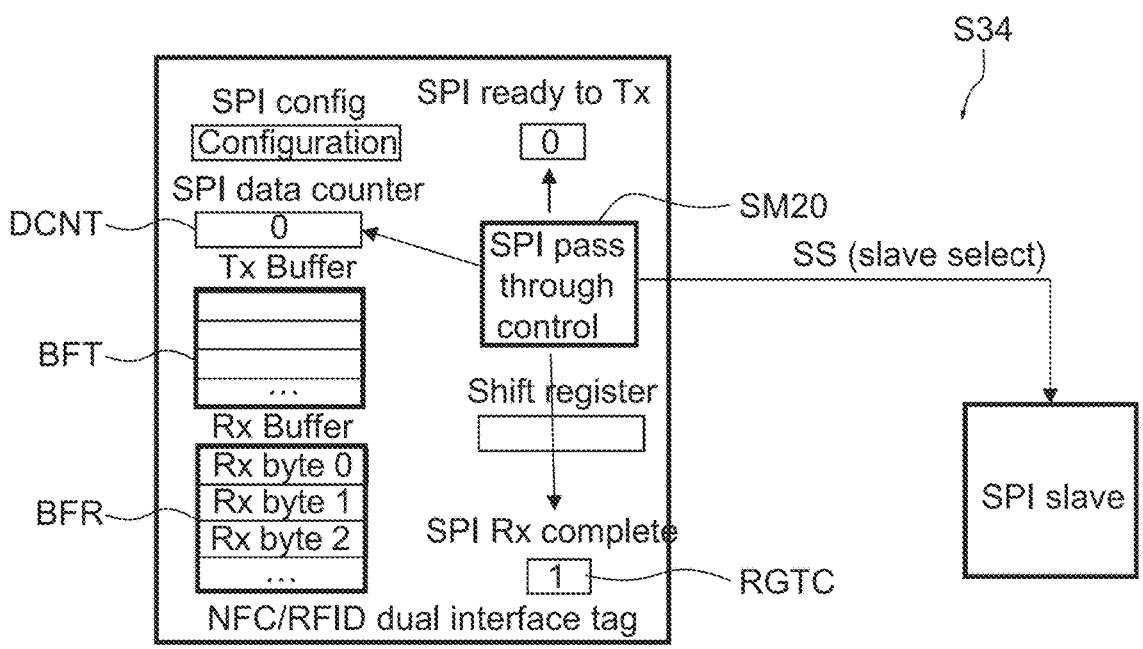
Figure 35:
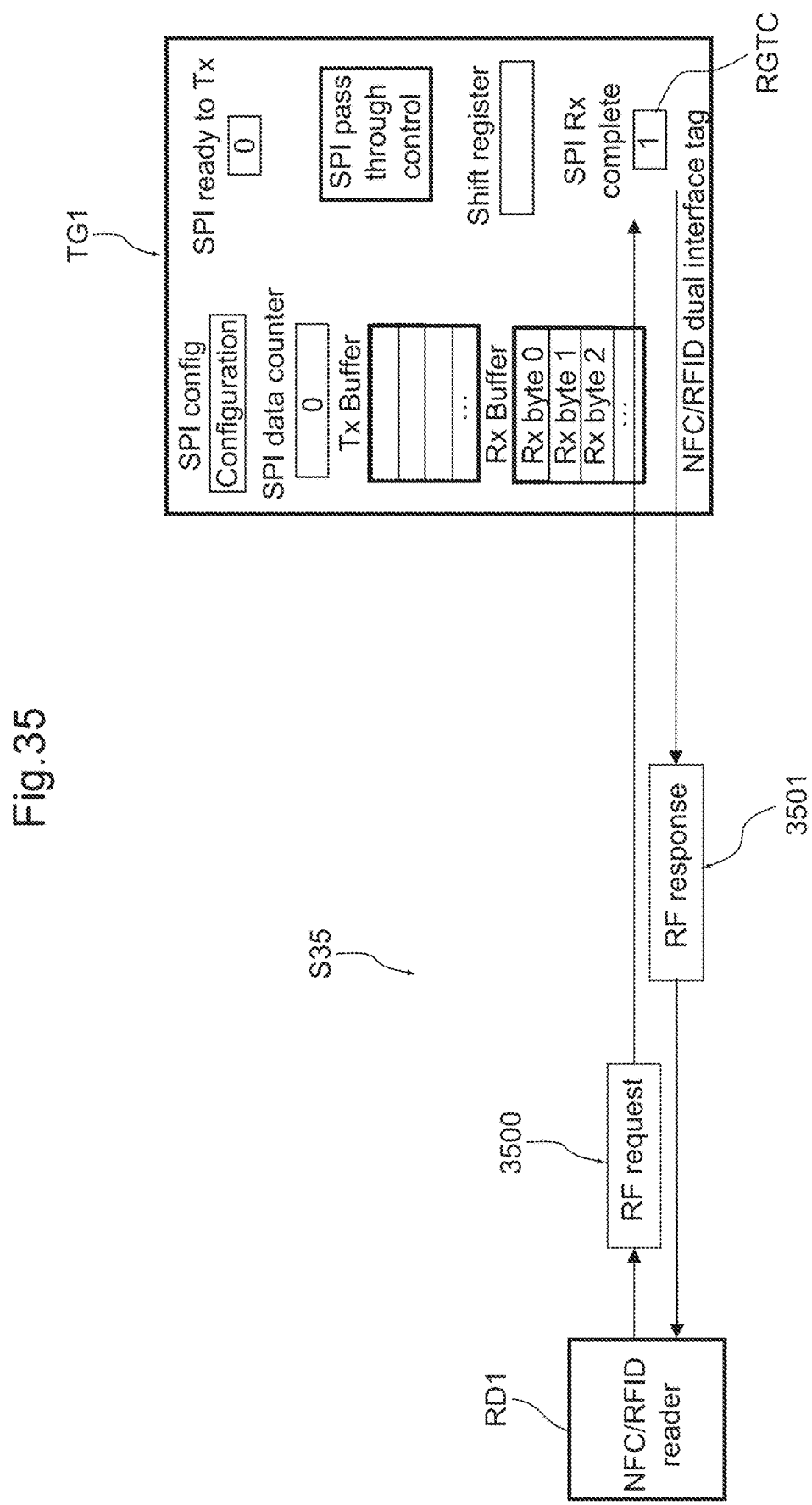

As illustrated in FIG. 34, once all Tx bytes are transmitted, the SPI pass-through state machine SM20 sets (step S34) the SPI Rx complete bit of the register RGTC to 1 and clears the SPI ready to Tx bit of the register RGRT to 0.

Rx buffer BFR now contains all the received bytes.

Tx buffer is empty (SPI data counter DCNT is null).

SS line is set to high to deselect the SPI slave.

More precisely, this RF command 3500 is processed by the RF state machine SM10 which reads the value contained in the register RGTC and sends it via a RF response 3501 to the reader RD1.

Figure 36:
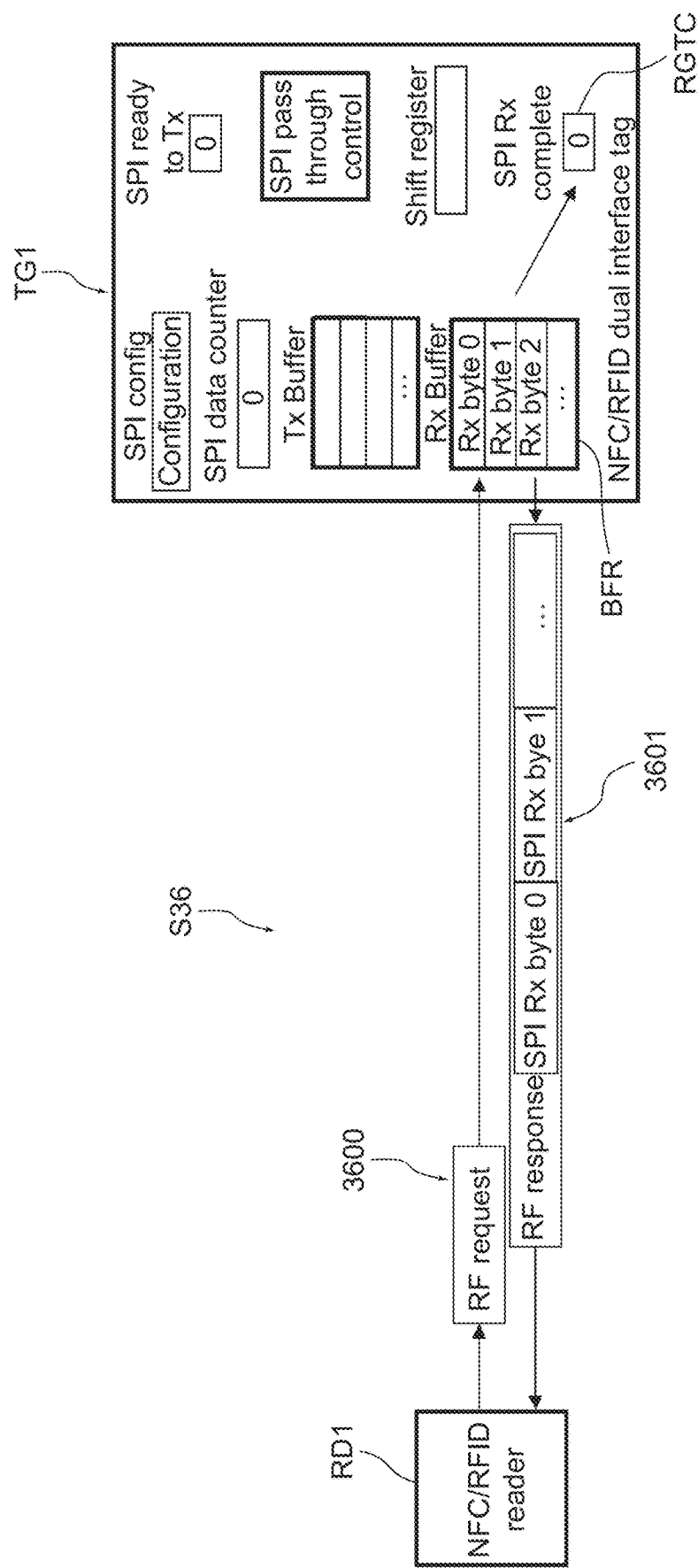

As illustrated in FIG. 36, the NFC/RFID reader RD1 sends (step S36) a read command 3600 to the NFC/RFID tag TG1 to read the SPI received bytes in the Rx buffer BFR.

More precisely, this RF command 3600 is processed by the RF state machine SM10 which reads the bytes contained in the Rx buffer BFR and sends them via a RF response 3601 to the reader RD1.

This toggles the "SPI Rx complete" bit contained in the register RGTC. In other words the RF state machine SM10 resets this bit to 0.

The NFC/RFID tag TG1 is now ready for a new SPI transmission.

FIGS. 37 to 44 illustrate an example of a SPI half-duplex transmission implemented by the system SYS1 according to embodiments.

As indicated above, in half-duplex transmission (so called 3 wire mode), data is transmitted and received on the same line.

The SPI state machine SM20 controls the direction of the output/input pin from/into the shift register SR.

Figure 37:
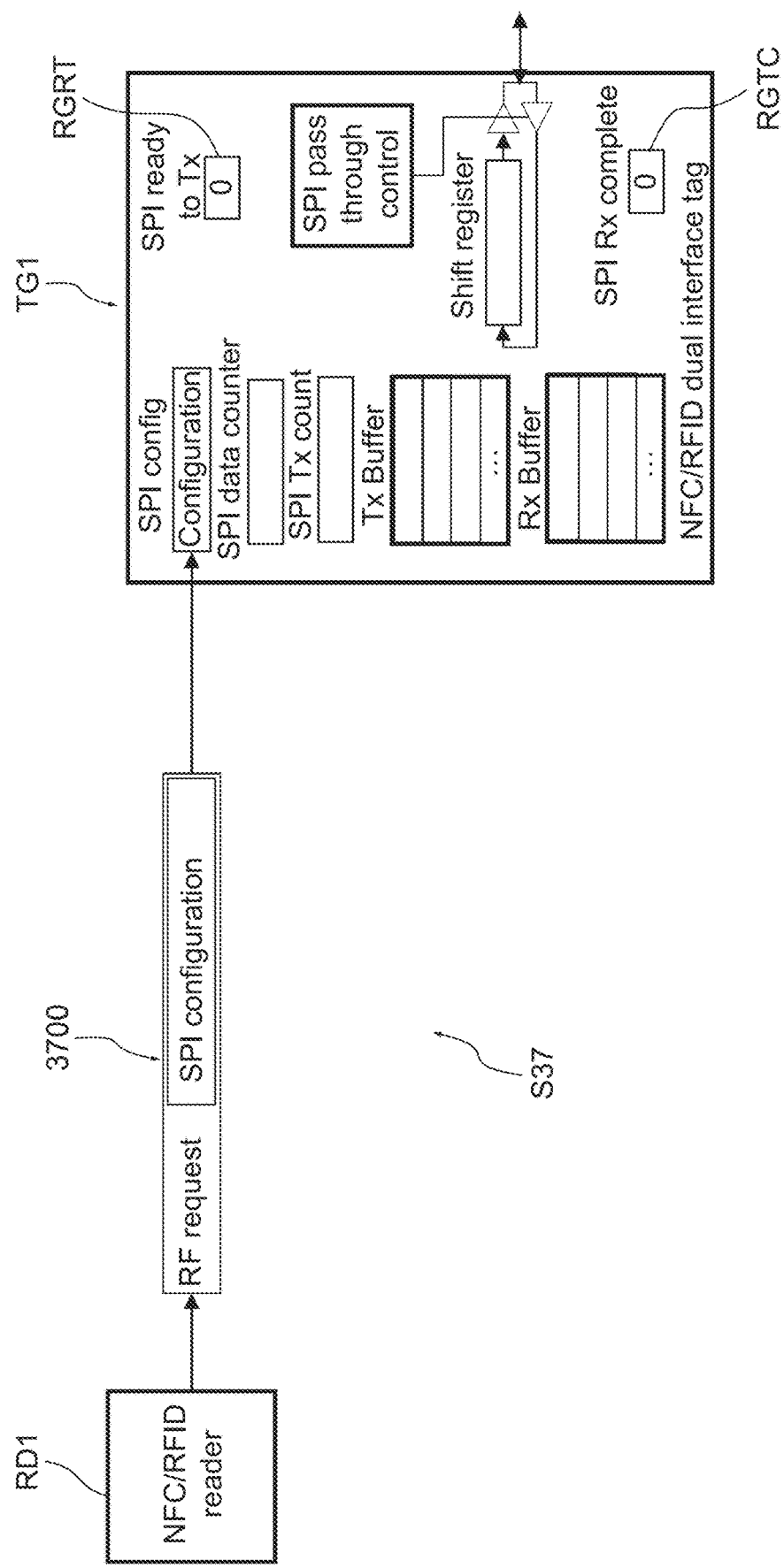

As illustrated in FIG. 37, the NFC/RFID reader RD1 sends (step S37) a RF write command 3700 to the NFC/RFID tag TG1 to configure the SPI bus by writing the SPI configuration into the SPI configuration register RGCF.

SPI configuration contains the following information:
CLKPOL: clock polarity to be used,
CLKPH: clock phase to be used,
CLK freq: clock frequency to be used,
Bit Polarity: to select if shift register is sending data MSB first or LSB first,
Half duplex mode selection.

The RF command 3700 has a conventional structure compliant with the used RF protocol, and the configuration information is included in the data payload of the RF command 3700.

This configuration information is extracted from the RF command by the state machine SM10 (RF pass through control) and written in the register RGCF by the state machine SM1 also (RF pass through control).

The register RGRT and the register RGTC contain a 0 value.

Figure 38:
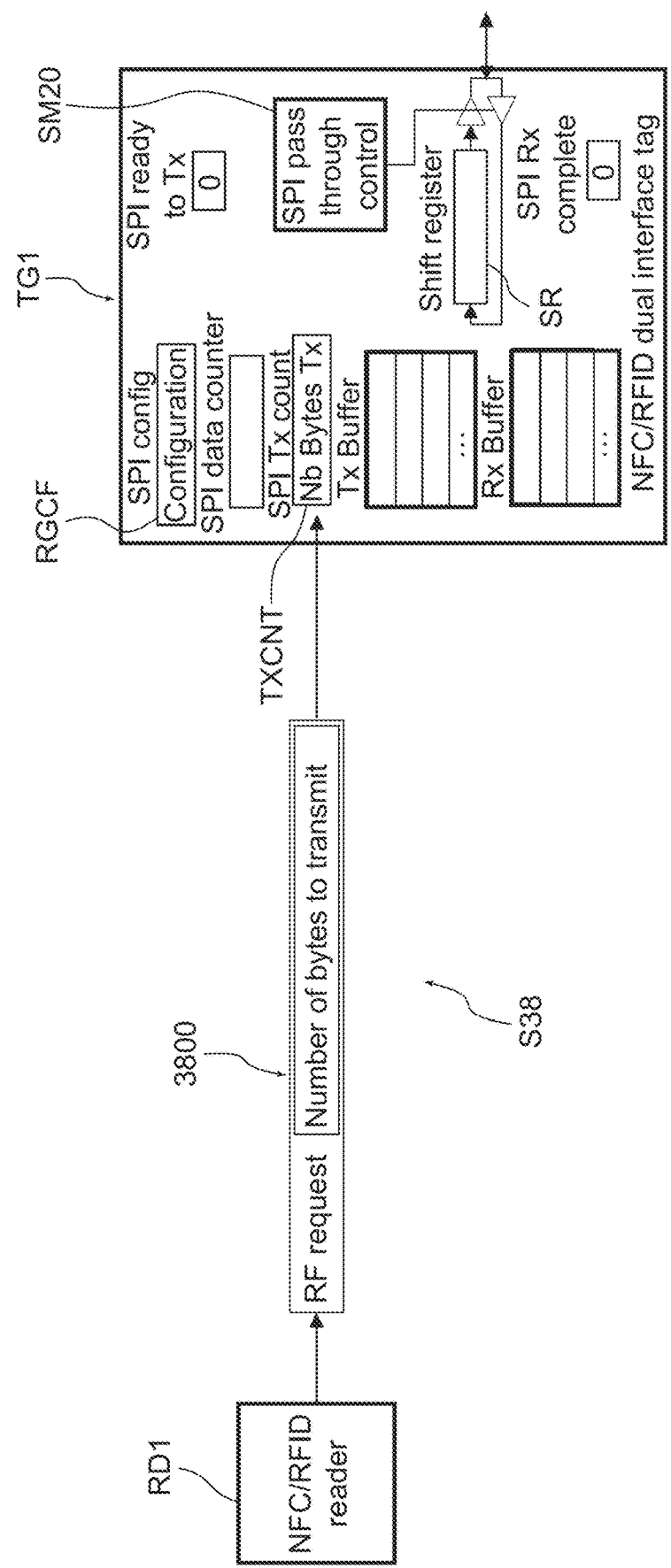

As illustrated in FIG. 38, the NFC/RFID reader RD1 sends (step S38) a RF write command 3800 to the NFC/RFID tag TG1.

This RF command 3800 contains the number of SPI bytes to transmit on SPI bus.

The state machine SM10 (RF pass through control) updates the counter TXCNT with the number of bytes to transmit on the SPI.

The number of bytes to transmit corresponds to the number of byte that will be sent from the master to the slave. The SPI data line is configured as output during this time. Once this number of bytes has been transmitted, the SPI line is configured as input to receive the remaining number of bytes counted by SPI data counter register DCNT.

Figure 39:
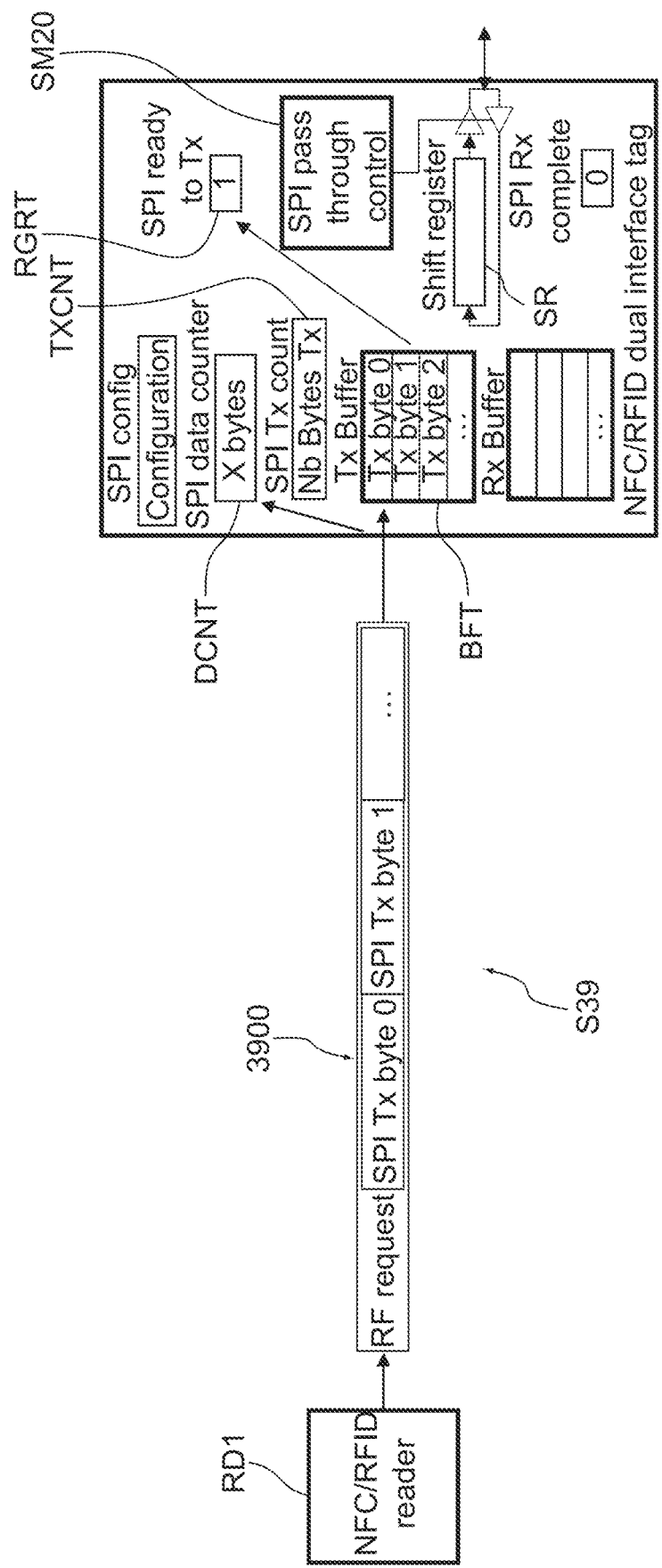

As illustrated in FIG. 39, the NFC/RFID reader RD1 sends (step S39) a RF write command 3900 to the NFC/RFID tag TG1.

This RF command 3900 contains SPI bytes to be transmitted on SPI bus.

This toggles the "SPI ready to Tx" bit of the register RGRT.

In other words the register RGRT is set to 1 by the state machine SM10 (RF pass through control).

The state machine SM10 (RF pass through control) writes into Tx buffer BFR the SPI bytes to be transmitted on the SPI bus and updates the counter DCNT with the number of bytes stored in the Tx buffer BFT. This represent the total number of bytes that goes through the SPI bus in output and input.

NFC/RFID reader RD1 has to put "dummy" Tx bytes to reflect the total number of bytes transmitted in output and input.

Figure 40:
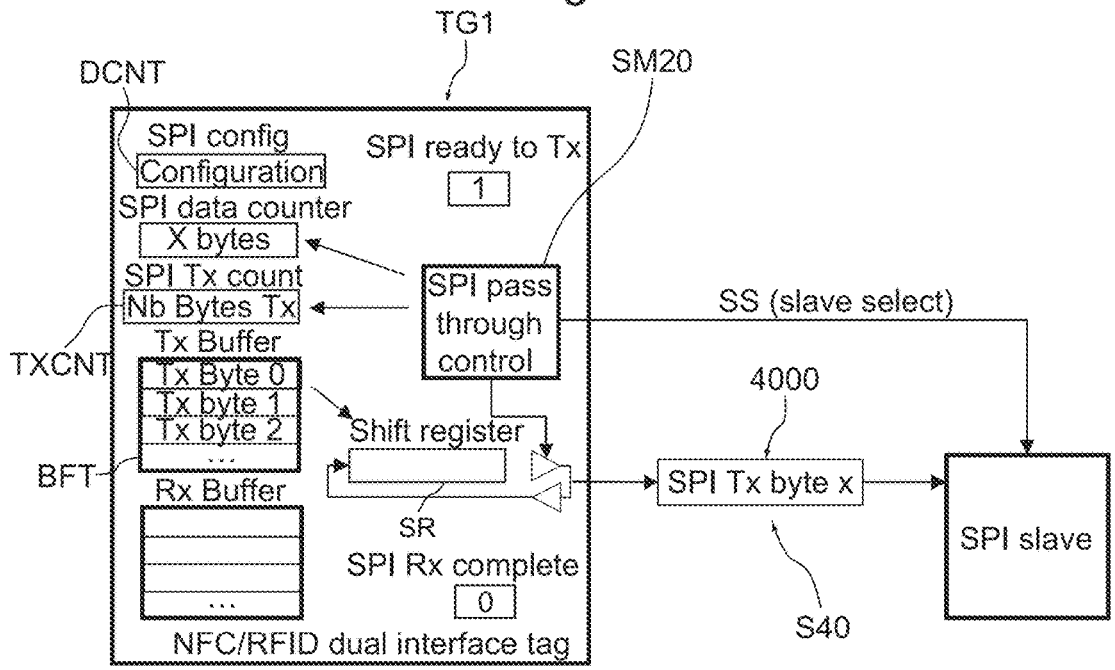

As illustrated in FIG. 40, once SPI Tx ready bit contained in register RGRT is set to 1, the SPI pass-through state machine SM20 does (step S40):
select the slave device by setting SS line low,
copy SPI bytes from Tx buffer BFT to the shift register SR and send them on the MOSI line to the slave,
decrease SPI data counter DCNT and loop until counter TXCNT is null.

Figure 41:
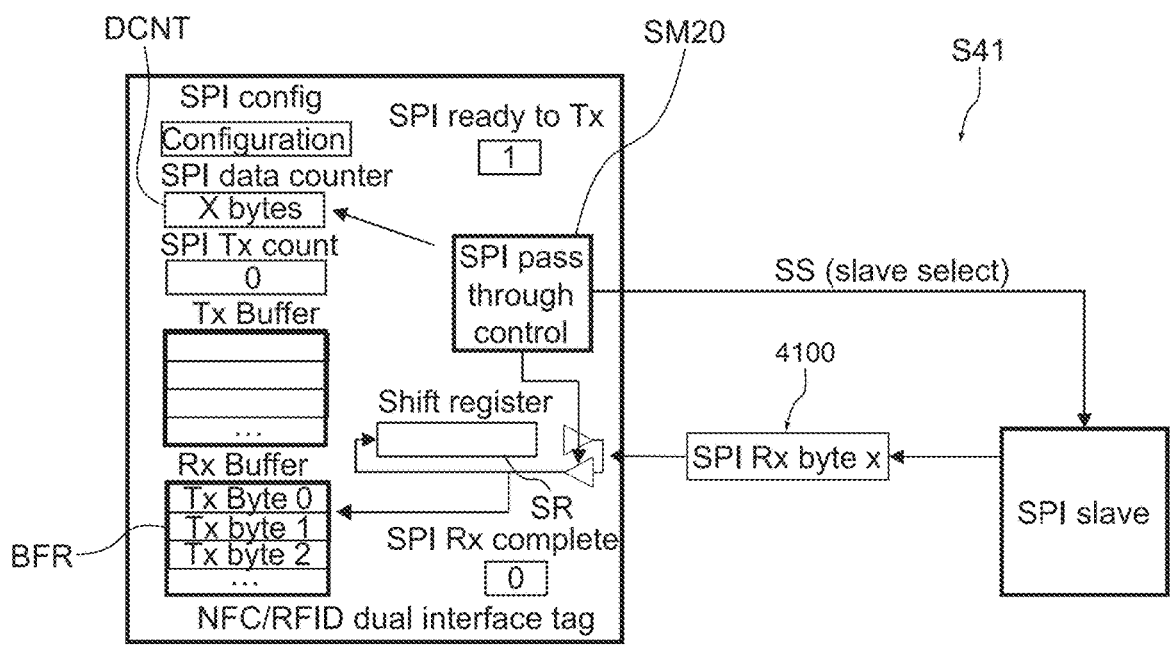

As illustrated in FIG. 41, once all Tx bytes are transmitted, the SPI pass-through state machine SM20 sets (step S41) the SPI data line to input and starts receiving the Rx bytes 4100.

More precisely, the state machine SM20 reads the line from the slave and copies the SPI received bytes from the shift register SR into the Rx buffer BFR, and decreases SPI data counter DCNT and loop until it is null.

Figure 42:
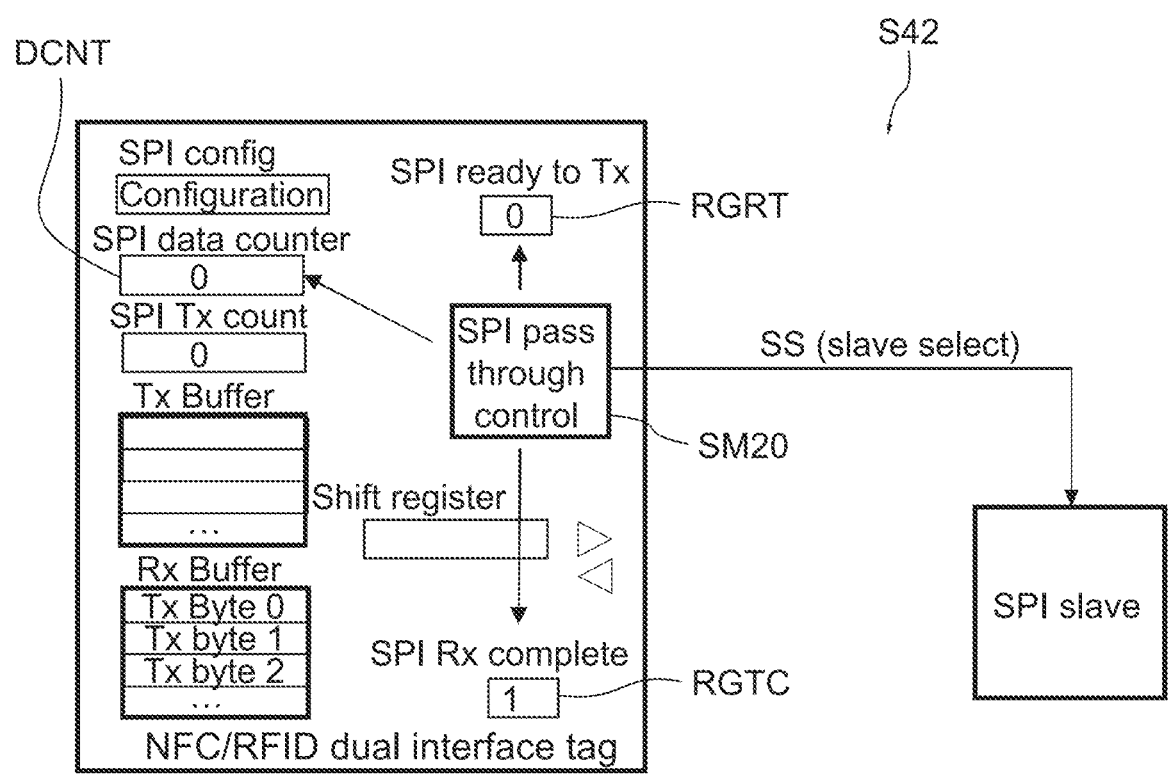

As illustrated in FIG. 42, once all Tx bytes are transmitted, the SPI pass-through state machine SM20 sets (step S42) the SPI Rx complete bit of the register RGTC to 1 and clears the SPI ready to Tx bit of the register RGRT to 0.

Rx buffer BFR now contains all the received bytes.
Tx buffer is empty (SPI data counter DCNT is null).
SS line is set to high to deselect the SPI slave.

Figure 43:
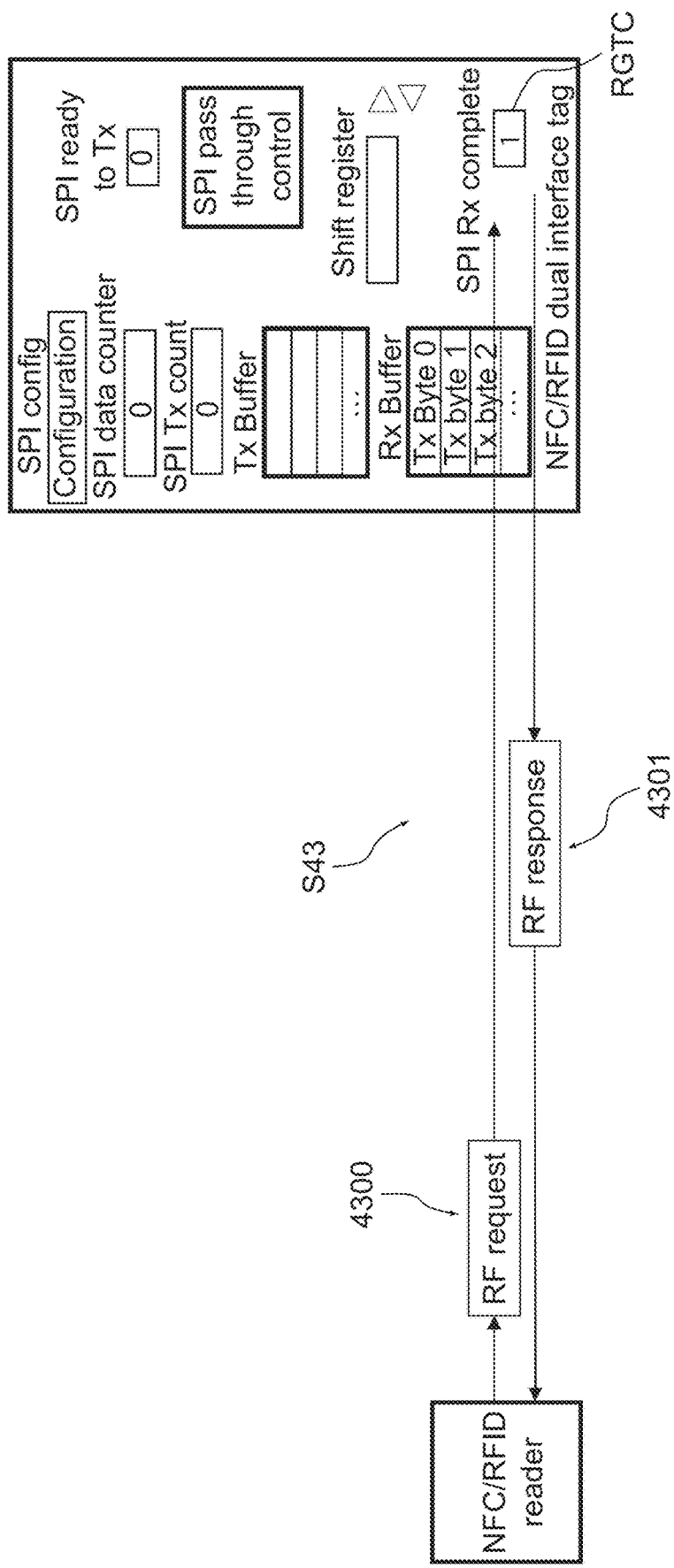

As illustrated in FIG. 43, the NFC/RFID reader RD1 sends (step S43) a RF read command 4300 to the NFC/RFID tag TG1 to read the "SPI Rx complete" bit contained in the register RGTC to check if SPI operation is terminated. If value is 1, the SPI write operation is over.

More precisely, this RF command 4300 is processed by the RF state machine SM10 which reads the value contained in the register RGTC and sends it via a RF response 4301 to the reader RD1.

Figure 44:
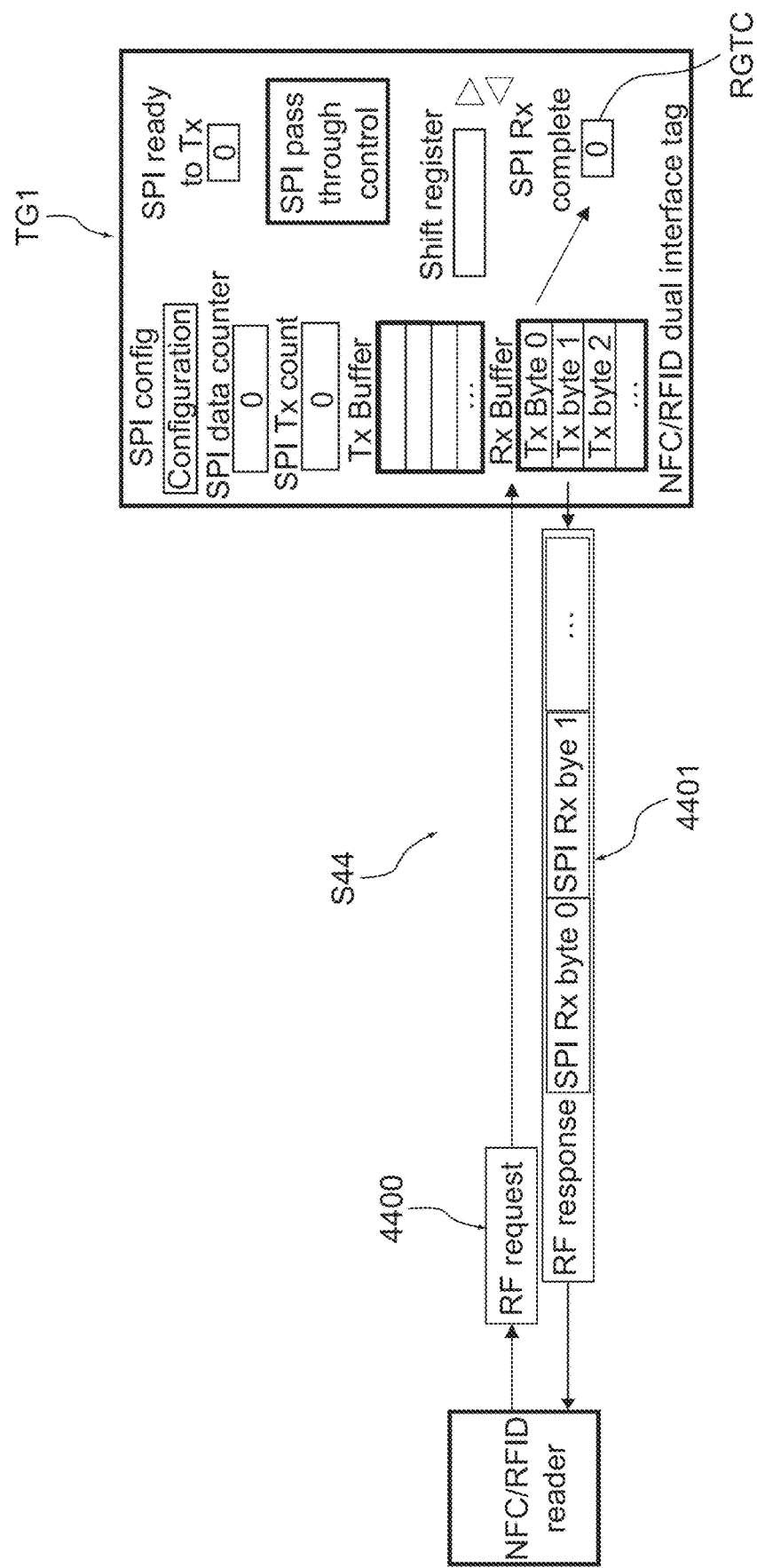

As illustrated in FIG. 44, the NFC/RFID reader RD1 sends (step S44) a read command 4400 to the NFC/RFID tag TG1 to read the SPI received bytes in the Rx buffer BFR.

More precisely, this RF command 4400 is processed by the RF state machine SM10 which reads the bytes contained in the Rx buffer BFR and sends them via a RF response 4401 to the reader RD1.

This toggles the "SPI Rx complete" bit contained in the register RGTC. In other words the RF state machine SM10 resets this bit to 0.

The NFC/RFID tag TG1 is now ready for a new SPI transmission.

As it can be seen from explanations related to FIGS. 31-44, the registers RGCF, RGRT, RGTC, DCNT, TXCNT contain control (called also configuration) data (one or several bits) which permit for example to determine the SPI configuration, or to indicate a status "ready to transmit" or the status of the operation (terminated for example) or numbers of bytes to transmit.

Those control registers are read and/or written
by the RF state machine SM10 upon reception of a RF command (request) sent by the reader, or
by the SPI state machine SM20.

More precisely, registers RGCF, RGRT, DCNT, TXCNT and RGTC are written by the RF state machine SM10.

For example if the register RGRT contains value 0, it means that there is no SPI command to be executed by the SPI state machine SM20.

If the register RGRT contains value 1, it means that there is a SPI command to be executed by the SPI state machine SM20.

The number of bytes to transmit on the SPI bus is determined by the contents of registers DCNT and eventually TXCNT.

In this respect the registers DCNT and TXCNT are also read by the state machine SM20.

The register RGRT is also read by the state machine SM20 to know if a command is to be executed on the bus and also written by the state machine SM20 when the execution of the command is terminated.

The register RGTC is written by the SPI state machine SM20 when the execution of the command is terminated and is read by the state machine SM10 upon request of the reader to know if the execution of a requested command is terminated.

This register RGTC is also reset by the state machine SM10.

Among those control data, the data contained in registers RGCF, DCNT and TXCNT are first control data sent within or deduced from data payloads of commands sent by the reader.

Figure 45:
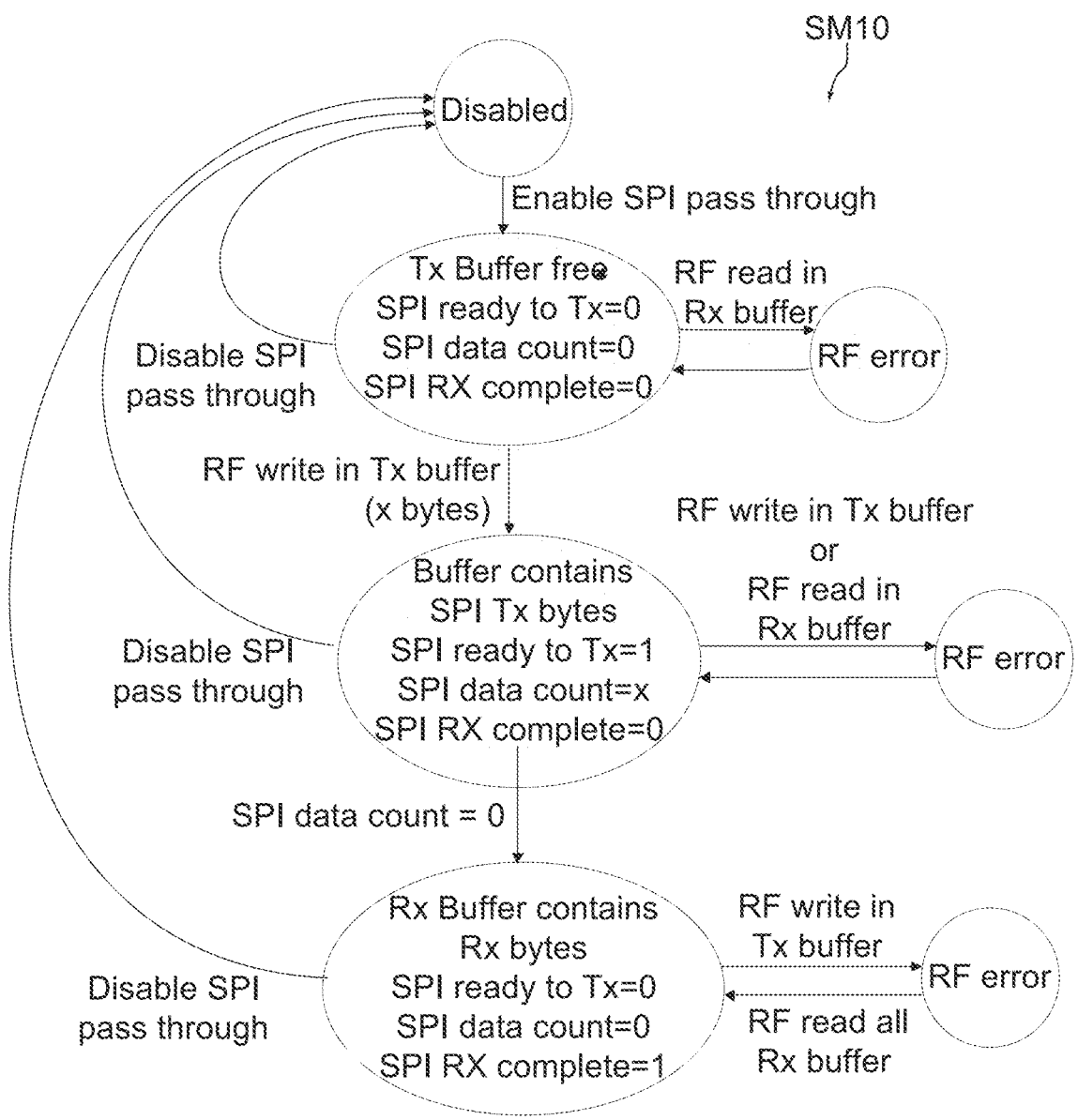
Figure 46:
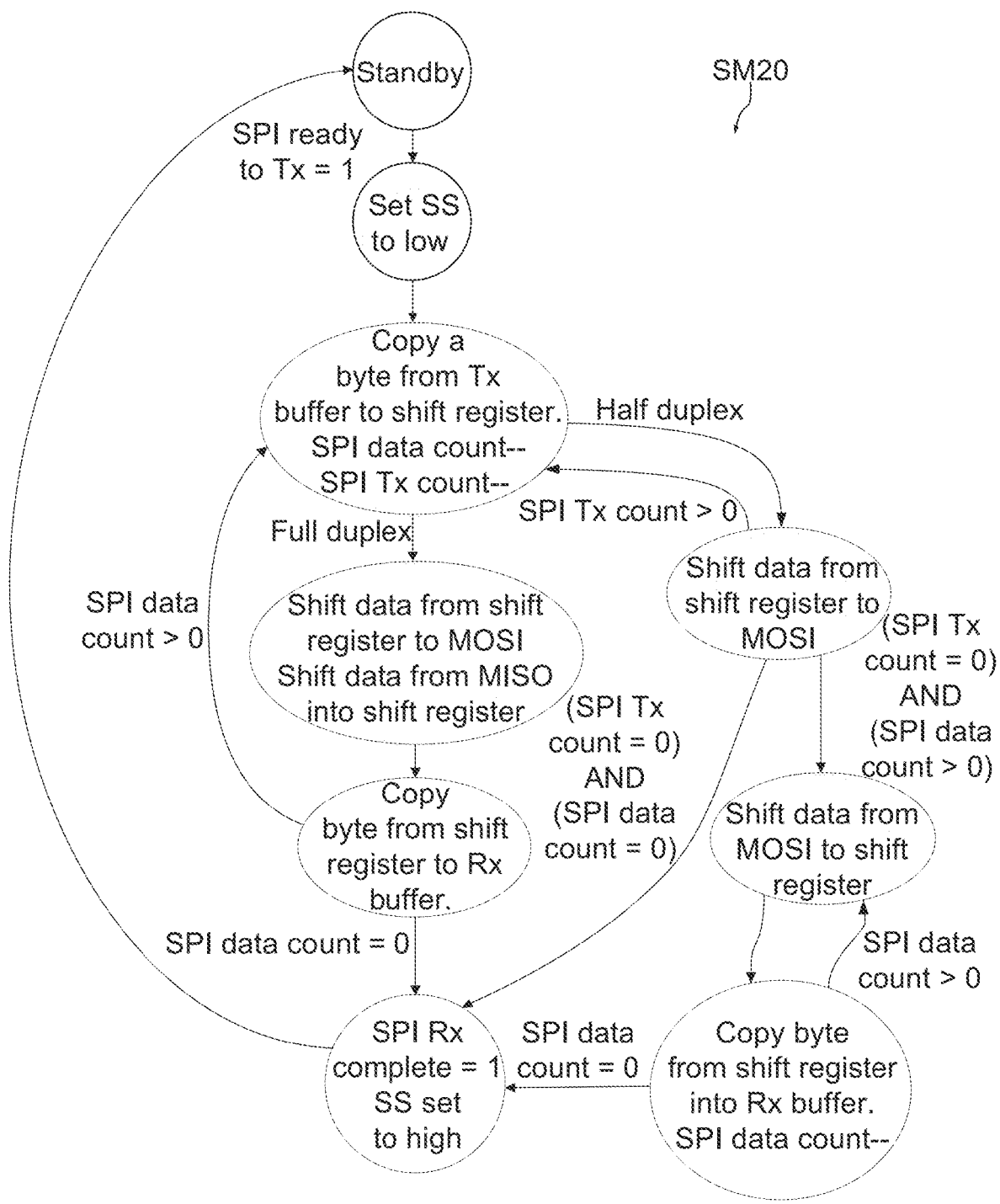

FIG. 45 details an example of the RF pass through state machine SM10 and FIG. 46 details an example of SPI pass through state machine SM20, both permitting to implement the steps disclosed in FIGS. 31-44.

FIGS. 47-52 illustrate examples of apparatuses according to embodiments using a SPI bus and a contactless transponder or tag according to embodiments, for example a tag or contactless transponder referenced ST25DV within the STMicroelectronics company having an integrated circuit modified for incorporating means of the embodiments.

Figure 47:
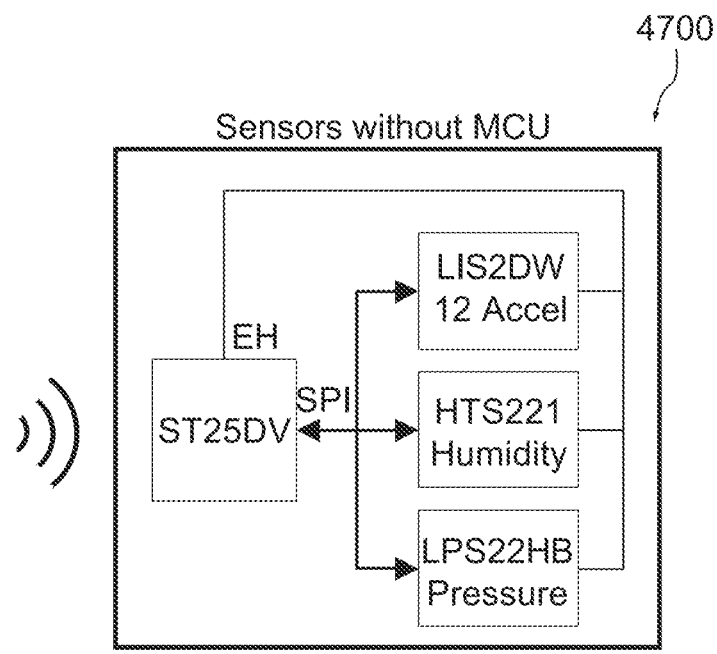
Figure 48:
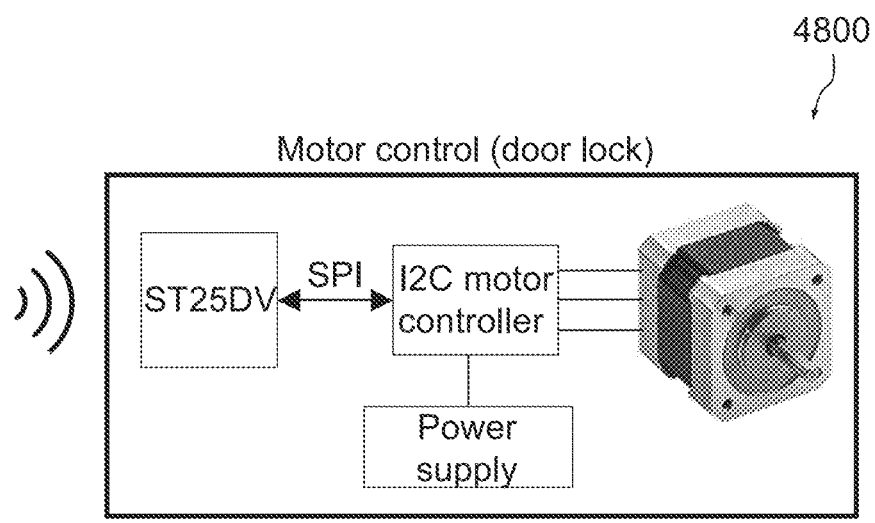
Figure 49:
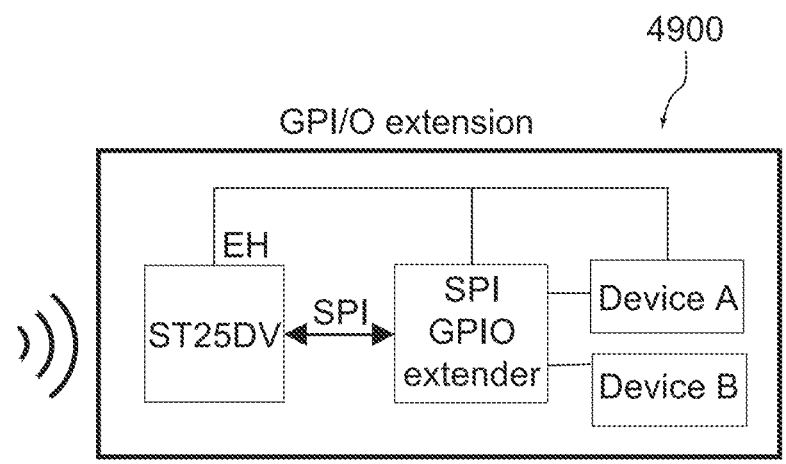
Figure 50:
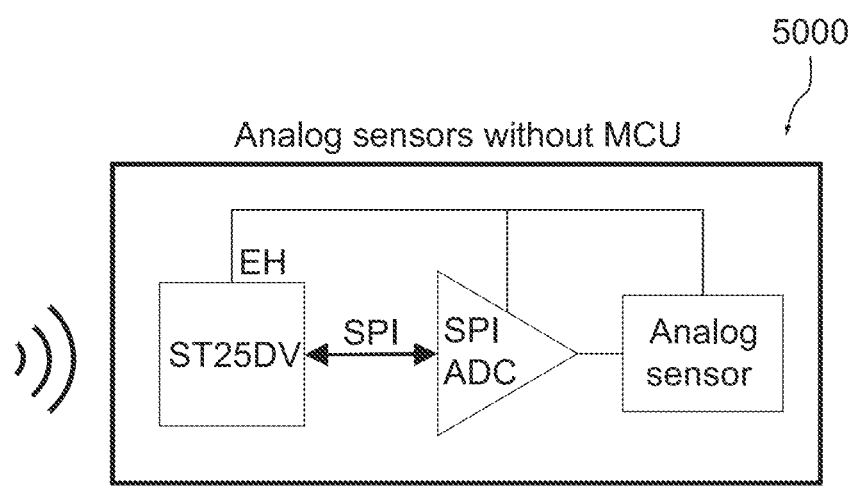
Figure 51:
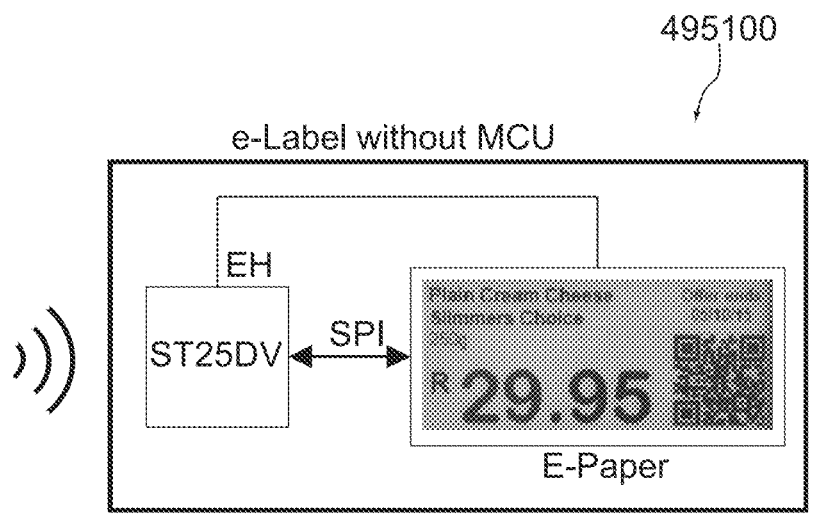
Figure 52:
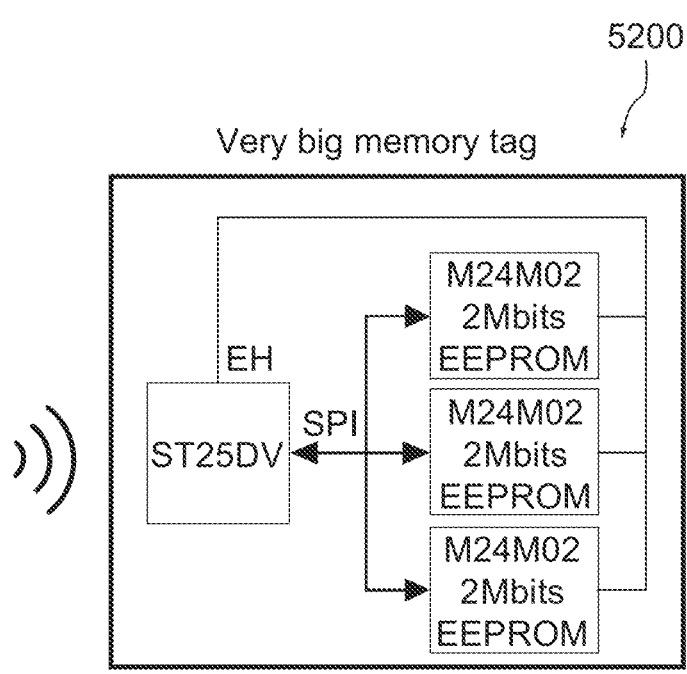

More precisely, FIG. 47 illustrates a sensor 4700 without MCU. FIG. 48 illustrates a door lock 4800. FIG. 49 illustrates GPI/O extension 4900. FIG. 50 illustrates an analog sensor 5000 without MCU. FIG. 51 illustrates e-Label 5100 without MCU. FIG. 52 illustrates a very big memory tag 5200.

The invention claimed is:

1. An apparatus comprising:
a contactless transponder including a contactless interface, pass-through circuitry, and a wired interface, wherein the contactless transponder is configured to communicate with a contactless reader according to a contactless protocol through the contactless interface, the contactless reader initiating commands within frames consistent with the contactless protocol;
a wired communication bus coupled to the wired interface; and
at least one circuit coupled to the wired communication bus,
wherein the contactless transponder is configured so that the contactless reader is a master on the wired communication bus when the contactless reader and the contactless transponder communicate,
wherein the pass-through circuitry is configured to:
implement a pass-through function for message exchange between the at least one circuit and the contactless reader, and
transform the commands initiated by the contactless reader into commands on the wired communication bus consistent with a wired protocol used on the wired communication bus.

2. The apparatus according to claim 1, wherein the at least one circuit is configured to directly communicate with the contactless reader through the contactless transponder.

3. The apparatus according to claim 1, wherein the pass-through circuitry comprises a first volatile memory configured to buffer data payload of commands received from the contactless reader through the contactless interface and data payload of responses intended to be sent to the contactless reader through the contactless interface.

4. The apparatus according to claim 3, wherein the first volatile memory comprises at least one buffer.

5. The apparatus according to claim 3, wherein the pass-through circuitry further comprises a second volatile memory configured to store control data, and wherein the pass-through circuitry is configured to implement the pass-through function for message exchange between the contactless reader and the at least one circuit on basis of the control data.

6. The apparatus according to claim 5, wherein the second volatile memory comprises a plurality of registers.

7. The apparatus according to claim 5, wherein the control data comprises first control data sent in or deduced from data payloads of some of commands received from the contactless reader.

8. The apparatus according to claim 7, wherein the control data comprises data defining whether a command from the contactless reader is a write operation or a read operation in the at least one circuit.

9. The apparatus according to claim 8, wherein the control data comprises data chosen from data defining a presence or the absence of an operation to be executed on the wired communication bus, data indicating whether an execution of a read operation requested by the contactless reader is terminated, data indicating whether a result of a read operation requested by the contactless reader is stored in the contactless transponder, or data indicating whether a read or write operation requested by the contactless reader is successful.

10. The apparatus according to claim 5, wherein the pass-through circuitry further comprises:
a first state machine configured to:
cooperate with the contactless reader through the contactless interface, and
write to or read from the first volatile memory and a part of the second volatile memory based on commands received from the contactless reader; and
a second state machine configured to:
cooperate with the wired communication bus through the wired interface based on a content of a part of the second volatile memory, and
write to or read first the first memory and a part of the second volatile memory.

11. The apparatus according to claim 10, wherein the second state machine is configured to:
read the data payload of commands from the first volatile memory and to execute them on the wired communication bus, and
manage a clock and all bus protocol signaling information.

12. The apparatus according to claim 11, wherein the second state machine is configured to read the wired communication bus and to store them in the first volatile memory to be read by the first state machine.

13. The apparatus according to claim 1, wherein the contactless transponder is configured to implement a half-duplex data exchange mechanism on a side of the contactless interface.

14. The apparatus according to claim 1, wherein the wired communication bus is an I2C bus.

15. The apparatus according to claim 1, wherein the commands received from the contactless reader comprises at least one request of a write operation to the at least one circuit or at least one request of a read operation to the at least one circuit.

16. The apparatus according to claim 15, wherein the at least one request of a write operation to the at least one circuit comprises an address of the at least one circuit and data to be written in the at least one circuit, and wherein the at least one request of a read operation to the at least one circuit comprises a number of bytes to be read and the address of the at least one circuit.

17. The apparatus according to claim 1, wherein the wired communication bus is a serial peripheral interface (SPI) bus.

18. The apparatus according to claim 17, wherein control data comprises data defining configuration of the SPI bus.

19. The apparatus according to claim 18, wherein the contactless transponder comprises a shift register coupled to the wired communication bus, and in a half-duplex transmission mode, a second state machine is configured to control a direction of the connection of the shift register on the wired communication bus.

20. The apparatus according to claim 1, wherein the commands received from the contactless reader comprises at least one write command or at least one request of a read command.

21. A system, comprising:
a contactless reader; and
an apparatus, comprising:
  a contactless transponder including a contactless interface, pass-through circuitry, and a wired interface, wherein the contactless transponder is configured to communicate with the contactless reader according to a contactless protocol through the contactless interface, the contactless reader initiating commands within frames consistent with the contactless protocol,
  a wired communication bus coupled to the wired interface, and
  at least one circuit coupled to the wired communication bus,
  wherein the contactless transponder is configured so that the contactless reader is a master on the wired communication bus when the contactless reader and the contactless transponder communicate
  wherein the pass-through circuitry is configured to:
    implement a pass-through function for message exchange between the at least one circuit and the contactless reader, and
    transform the commands initiated by the contactless reader into commands on the wired communication bus consistent with a wired protocol used on the wired communication bus.

22. A method for communicating between a contactless reader and an apparatus, the method comprising:
initiating, by the contactless reader, commands within frames consistent with a contactless protocol;
communicating, by a contactless transponder of the apparatus, with the contactless reader according to the contactless protocol through a contactless interface of the contactless transponder;
communicating, by the contactless reader, with a circuit through to a wired communication bus coupled to a wired interface of the contactless transponder, the contactless reader being a master on the wired communication bus when the contactless reader and the contactless transponder communicate;
implementing, by a pass-through circuitry of the contactless transponder, a pass-through function for message exchange between the circuit and the contactless reader; and
transforming, by the pass-through circuitry, the commands initiated by the contactless reader into commands on the wired communication bus consistent with a wired protocol used on the wired communication bus.

23. The method of claim 22, wherein the pass-through circuitry comprises a first volatile memory, the method further comprising:
buffering data payload of commands received from the contactless reader through the contactless interface; and
buffering data payload of responses intended to be sent to the contactless reader through the contactless interface.

24. The system of claim 21, wherein the pass-through circuitry comprises a first volatile memory configured to:
buffer data payload of commands received from the contactless reader through the contactless interface; and
buffer data payload of responses intended to be sent to the contactless reader through the contactless interface.

* * * * *